(12) United States Patent
Liu et al.

(10) Patent No.: US 11,762,926 B2
(45) Date of Patent: Sep. 19, 2023

(54) RECOMMENDING WEB API'S AND ASSOCIATED ENDPOINTS

(71) Applicant: FUJITSU LIMITED, Kawasaki (JP)

(72) Inventors: Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 534 days.

(21) Appl. No.: 16/416,403

(22) Filed: May 20, 2019

(65) Prior Publication Data

US 2020/0372088 A1 Nov. 26, 2020

(51) Int. Cl.

| G06F 16/9535 | (2019.01) |
| G06F 9/54 | (2006.01) |
| G06F 16/9532 | (2019.01) |
| G06N 20/00 | (2019.01) |
| G06F 16/9538 | (2019.01) |
| G06F 40/205 | (2020.01) |

(52) U.S. Cl.
CPC ......... *G06F 16/9535* (2019.01); *G06F 9/547* (2013.01); *G06F 16/9532* (2019.01); *G06F 16/9538* (2019.01); *G06F 40/205* (2020.01); *G06N 20/00* (2019.01)

(58) Field of Classification Search
None
See application file for complete search history.

(56) References Cited

U.S. PATENT DOCUMENTS

| 9,588,739 | B2 | 3/2017 | Cuomo et al. | |
| 2018/0165135 | A1 | 6/2018 | Bahrami et al. | |
| 2018/0196643 | A1* | 7/2018 | Dolby | .............. H04L 67/025 |
| 2018/0232442 | A1* | 8/2018 | Duesterwald | ........... G06F 16/93 |
| 2020/0019699 | A1* | 1/2020 | Araujo | .............. G06F 21/57 |

* cited by examiner

*Primary Examiner* — Thu N Nguyen
(74) *Attorney, Agent, or Firm* — Fujitsu Patent Center

(57) ABSTRACT

A method includes extracting, from a web application programming interface (API) repository, first information associated with a plurality of web APIs and constructing an initial dataset associated with the plurality of web APIs by performing a first set of information processing operations on the extracted first information. The method further includes constructing a training dataset by performing a second set of information processing operations on the constructed initial dataset and obtaining a Machine Learning (ML) model based on the constructed training dataset. The method further includes receiving an input natural language query via an electronic user interface (UI) and providing the received input natural language query to the obtained ML model. The method further includes outputting a set of recommendation results based on the provided input natural language query to the obtained ML model. Each recommendation result includes a specific API name and a specific endpoint.

19 Claims, 14 Drawing Sheets

```
{
  swagger: "2.0",
  schemes: [
    "https"
  ],
  host: "api.musified.com",
  basePath: "/v1",
  info: {
    title: "Musified",    402
    Version: "v1",
    x-miner-domain: "musified_web_api",
    x-origin: {
      format: "raml",
      url: "https://raw.githubusercontent.com/musified/web-api/master/specifications/raml/api.raml",
      version: "0.8"
    },
    x-providerName: "musified.com",
    description: "Our Web API lets your applications fetch data from the Musified music catalog and manage user's playlists and saved music.",    404
  },
  x-tags: [
    "music",
    "authorization",
    "data",
    "recommendation",
    "metadata"
  ]...
```

FIG. 4A

Musified Web API

[ Music ] [ Data Mining ] — 412

The Musified Web API allows developers to use their application to get data from the musified music catalog. The endpoints results in JSON format providing information such as artists, albums, and tracks directly from the Musified catalog. Depending on user's authorization, the API can also provide developers access to user-related data, i.e. playlists and music saved in user's library. — 414

Specification

| | |
|---|---|
| API Endpoint | https://api.musified.com/v1/ |
| API Portal/Home Page | https://developer.musified.com/web-api |
| Primary Category | Music |
| Secondary Categories | Data Mining |
| API Provider | Musified |
| SSL Support | Yes |

RECOMMENDING WEB API'S AND ASSOCIATED ENDPOINTS

FIELD

The embodiments discussed in the present disclosure are related to recommending web application programming interfaces (APIs) and associated endpoints.

BACKGROUND

Many companies and organizations offer a Web API infrastructure that offers different web APIs for several applications, such as speech processing and social media analysis, to third party developers and/or third party organizations. Typically, web APIs are programmatic interfaces with publicly exposed endpoints, which specify where resources can be accessed by a third party software. Third party developers have to include specific code for a desired web API in their application code to integrate the functionally offered by the desired web API. In many scenarios, web APIs enable these third party developers to design all types of more accessible and useful solutions to meet customers' expectations, in less time and at a lower cost. As businesses have realized the growth opportunities associated with running an open platform offering web APIs to third party developers, the number of available web APIs has grown consistently over past years. With the rapid growth of Web APIs, these third party developers encounter a question "which API suits my needs?" It would take a lot of time for these third party developers to find the desired API/endpoint for their specific software application. Conventional platforms offer a keyword-based search for a web API/endpoint from an API repository. The keyword-based search relies on exact match of keyword(s) in the search query with API information in the API repository. Often, the keyword-based search renders no search results or results which are inaccurate or less exhaustive/relevant.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include extracting, from a web application programming interface (API) repository, first information associated with a plurality of web APIs and constructing an initial dataset associated with the plurality of web APIs by performing a first set of information processing operations on the extracted first information. The operations may further include constructing a training dataset by performing a second set of information processing operations on the constructed initial dataset. The constructed training dataset may include a plurality of natural language queries, a plurality of web API names, and a plurality of endpoints associated with the plurality of web API names. The operation may further include obtaining a Machine Learning (ML) model based on the constructed training dataset. The ML model may be trained based on the constructed training dataset. The operations may further include receiving an input natural language query via an electronic user interface (UI) of a user device and providing the received input natural language query to the obtained ML model. The operation may further include outputting a set of recommendation results based on the provided input natural language query to the obtained ML model. Each recommendation result may include a specific API name of the plurality of web API names and a specific endpoint of the plurality of endpoints.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 4A, 4B, and 4C, collectively illustrate example documents in a web API repository;

DESCRIPTION OF EMBODIMENTS

Figure 1:
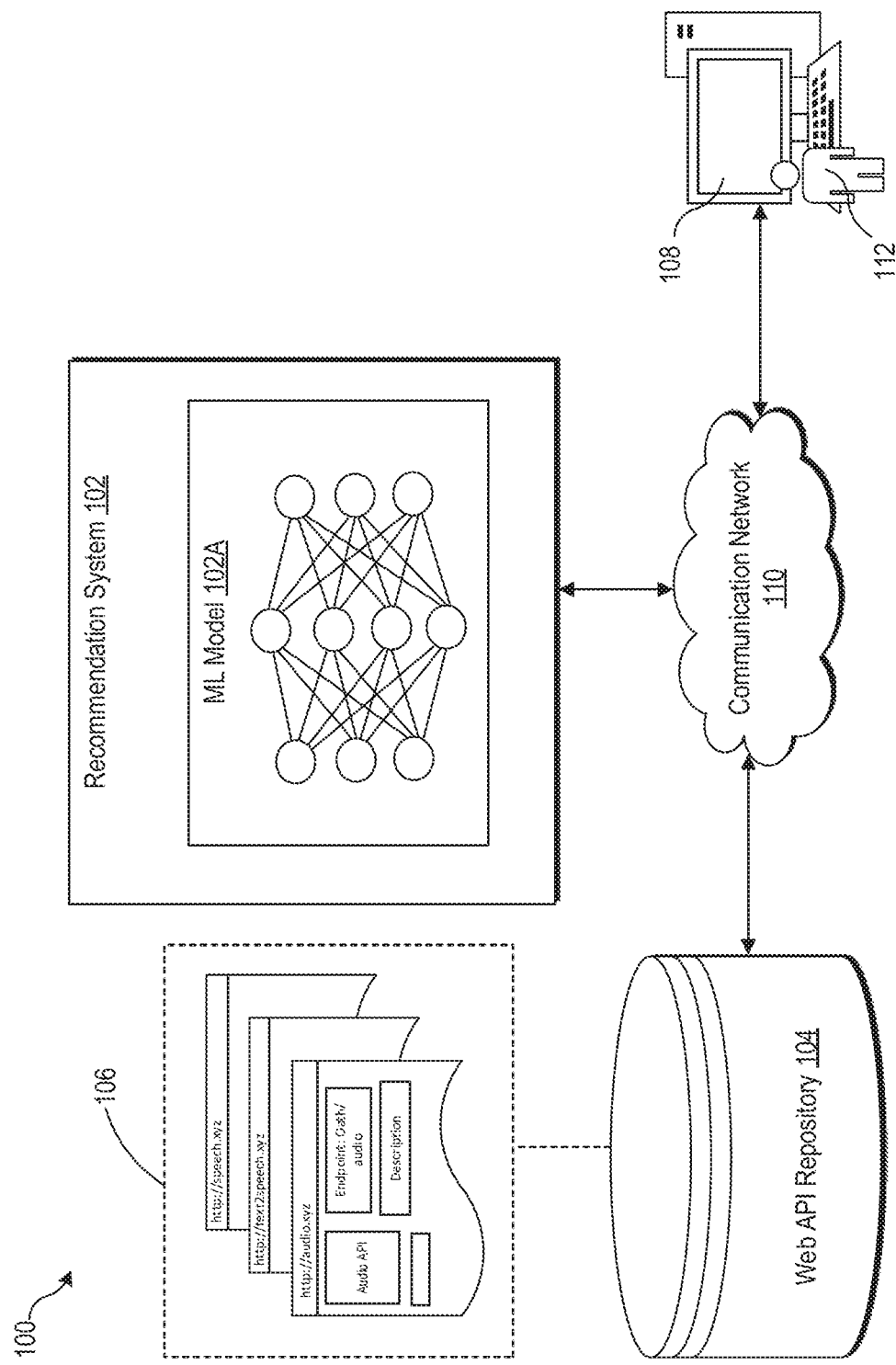
FIG. 1 is a diagram representing an example environment related to recommending web APIs and associated endpoints.

Some embodiments described in the present disclosure relate to a method and a non-transitory computer-readable medium for recommending web application programming interfaces (APIs) and associated endpoints. The present disclosure relates to the use of a recommending system for extracting information associated with a plurality of web APIs from a web API repository and constructing a training dataset for building a machine learning (ML) model that outputs recommendation results, including one or more API names and one or more endpoints for an input natural language query from an end-user, such as a developer.

According to one or more embodiments of the present disclosure, the technological field of web/software application development and deep learning may be improved by providing the ML model (i.e. a trained ML model) on the recommending system in a manner in which the recommendation system is able to output recommendation results based on the provided input natural language query. Also, an electronic user interface is provided to the user to enable the user (e.g., an app developer) to provide the input natural language query via the electronic user interface (UI) of a user device.

According to one or more embodiments of the disclosure, the ML model is based on a dual stage learning architecture. Due to the dual stage learning architecture, the ML model achieves a high classification accuracy (e.g., ~90% accuracy) as compared to a standard deep learning model. As an example, for the same problem, a classification accuracy of "~50%" is achieved using conventional Bi-Long Short-Term Memory (LSTM) only network to recommend web API and its endpoint. The ML model differs from other conventional searching/recommending system as it is specifically designed for Web API recommendation and focuses on finding the most suitable Web API and its endpoint based on users' query. Also, the ML model recommends both API and its endpoint together while considering the relationship between API and its endpoint.

Typically, conventional methods rely on a keyword-based search approach for recommending a web API name/endpoint using a search query provided by a user. The keyword-based search approach typically looks for an exact match of keyword(s) in the search query with API information present in the managed search databases. Often, the keyword-based search renders inaccurate or less exhaustive results which may be less relevant for the user. In many instances, finding a suitable API and endpoint for use in a software application can be frustrating and time consuming due to the huge number of existing web APIs, and this number is rapid increasing. The search may include reading a large amount of API documentation and searching online websites in an attempt to identify a web API that is reliable and suitable for the particular application. One particular difficulty is that many of the existing APIs lack detailed documentation which may be used to guide software developers. Another difficulty is that even the open-source websites which host large repositories of source code including web API(s) are not easily searchable according to real-world usage, keywords, or the like.

In contrast, the present disclosure provides the ML model which determines web API(s) and associated endpoint(s)) matching closely to an input natural language query from the user. The method can be used to recommend both web API(s) and its endpoint(s) simultaneously based on the input natural language query. The ML model is trained on a training dataset, i.e. a query corpus, including synthesized natural language queries, web API names, and endpoints mapped to the synthesized natural language queries. The training dataset for training the ML model incorporates different approaches to generate question-type queries, command-type queries, keyword-type queries, and API title-type queries. The present disclosure also includes a method to improve the performance of the ML model over time by updating the training dataset based on new input language queries and users' feedback, and further retraining the ML model. The retrained ML model outputs improved recommendation results as it learns over more variations of input natural language queries.

The disclosed method provides a robust search approach which can handle the input natural language query with similar semantic meaning but different words or sentence structure. This may further help to reduce developer's effort in forming queries that could yield better results using conventional keyword-based search approach. Instead, the disclosed method allows recommendation of both web API name and endpoint together, along with a confidence score for the recommendation.

The ability to reliably and efficiently use input natural language queries for recommending web APIs and its endpoints may provide a number of benefits to the operation of a computer itself, and improvements to the related field of computer programming. With respect to the computer itself, the use of a trained ML for determining which web APIs and its associated endpoints are to be recommended to the user based on input natural language query, may provide the computer with improved functionality. It may also allow the computer to invoke and/or implement new functionality that has not existed before, and to generate such functionality in an automated manner. For example, the present disclosure may facilitate generation of recommendation results so as to enable a user, such as a developer, to incorporate the functionality of an appropriate web API and endpoint in desired software applications.

With respect to improving computer programming, the present disclosure may provide enhanced capabilities for software development. For example, the present disclosure may provide relevant recommendation results comprising web API names and endpoints, which may help the user to incorporate computer code for desired web API from the recommendation results in software applications. This may further enable software developers to provide software solutions to their clients more efficiently and reliably.

Embodiments of the present disclosure are explained with reference to the accompanying drawings.

FIG. 1 is a diagram representing an example environment related to recommending web APIs and associated endpoints, arranged in accordance with at least one embodiment described in the present disclosure. With reference to FIG. 1, there is shown an example environment 100. In the example environment 100, there is shown a recommendation system 102 and a web application programming interface (hereinafter, API) repository 104 including a plurality of documents 106 associated with a plurality of web APIs. There is further shown a user device 108 and a communication network 110. The recommendation system 102, the web API repository 104, and the user device 108 may be communicatively coupled to each other, via the communication network 110. The recommendation system 102 may include a machine learning (hereinafter, ML) model 102A. There is further shown a user 112 who may be associated with the user device 108.

The recommendation system 102 may be one or more of a software process, a set of machine-executable instructions on a computing device, or a computing system including devices, software codes, or combinations thereof. The recommendation system 102 may be configured to deploy the ML model 102A to output a set of recommendation results comprising a list of web APIs and associated endpoints matching an input natural language query of a user (such as the user 112). In order to deploy the ML model 102A, the ML model 102A may need to be first trained on a training dataset, which may be obtained based on information that may be extracted from publicly available information, accessible via an internet network or an intranet network.

The recommendation system 102 may need to perform a search for the publicly available information including, but not limited to, API documentations, API specification documents, web pages on API repositories, API mash-ups, and usage guides. The search may be performed on the web via the internet network or the intranet network. For example, the recommendation system 102 may include a web crawler or web scraper (e.g. a crawler bot or a scraper bot) that may be configured to look for and collect the publicly available information associated with the plurality of web APIs from one or more computer-based sources storing the publicly available information on the web. The publicly available information may be also referred to as the web API repository 104 which may include the plurality of documents 106 associated with the plurality of web APIs. Each document of the plurality of documents 106 may include information mapped to a plurality of fields associated with a corresponding web API of the plurality of web APIs. In each document, the plurality of fields may include, for example, an API description field, an endpoint description field, an API title field, and fields for input/output parameters, a primary category, a secondary category, and one or more tags.

The web API repository 104 may be collected from the one or more computer-based sources for the publicly available information associated with the plurality of web APIs. The one or more computer-based sources may include, but are not limited to, a web server, client computer, a dedicated API store, a file server storing API documentations, and an API search platform. The plurality of documents 106 in the one or more computer-based sources may be in any electronic format which may be a machine-readable and/or human readable format. Also, the plurality of documents 106 may be available in any language, for example, English, Japanese, German, and the like. In one or more embodiments, at least one computer-based source may be a search platform which may enable a user (such as the user 116) to look up and find information associated a desired web API.

The recommendation system 102 may be configured to extract, from the web API repository 104, first information associated with the plurality of web APIs. The extracted first information may include the API description, the endpoint description, the input parameter description, the output parameter description, the primary category, the secondary category, the one or more tags, and the API title associated with each web API of the plurality of web APIs. Some examples of the plurality of documents based on which the first information is extracted, are provided in FIGS. 4A, 4B, and 4C.

The recommendation system 102 may be configured to construct an initial dataset associated with the plurality of web APIs by performing a first set of information processing operations on the extracted first information. The first set of information processing operations may include, for example, tokenization, sentence filtering (such as removal of stop words, symbols, before/after spaces), and stemming operation. Further, the recommendation system 102 may be configured to construct the training dataset by performing a second set of information processing operations on the constructed initial dataset. The constructed training dataset may include a plurality of natural language queries, a plurality of web API names, and a plurality of endpoints associated with the plurality of web API names. The construction of the initial dataset and the training dataset are further described in detail, for example, in FIG. 5 and FIG. 6, respectively. The constructed training dataset may correspond to a query corpus which may be used to train the ML model 102A. Once trained, the ML model 102A may be deployed on the recommendation system 102. The recommendation system 102 may be configured to receive an input natural language query via an electronic user interface (hereinafter, UI) of the user device 108.

The user device 108 may comprise suitable logic, circuitry, and interfaces that may be configured to display the electronic UI on a display of the user device 108. The electronic UI 214 may include a search interface for receiving an input natural language query from a user (such as the user 112). The user device 108 may be configured to communicate user requests including the input natural language query to the recommendation system 102, via the communication network 110. The user device 108 may be a computer-based hardware device that includes a processor, memory, and includes a network interface for communication capabilities. Some examples of the user device 108 may include, but are not limited to, a mobile phone, a smartphone, a tablet computer, a laptop computer, a desktop computer, a workstation, a server, or other computing devices.

The recommendation system 102 may be configured to provide the received input natural language query to the ML model 102A. The ML model 102A may be configured to output a set of recommendation results. Each recommendation result may include a specific API name of the plurality of web API names and a specific endpoint of the plurality of endpoints. The specific API name and the specific endpoint may be recommended to the user based on the input natural language query. The recommendation system 102 may be configured to communicate the set of recommendation results to the user device 108, via the communication network 110. The user device 108 may be configured to display the set of recommendation results onto the electronic UI.

In certain embodiments, the set of recommendation results may include a set of likelihood values and a set of output pairs of API name and endpoint corresponding to the set of likelihood values. Each likelihood value of the set of likelihood values may be indicative of a degree of match/confidence score for a corresponding output pair of API name and endpoint with the input natural language query.

In one or more embodiments, the recommendation system 102 may be further configured to receive a user selection of a first recommendation result of the set of recommendation results. Also, the recommendation system 102 may be further configured to receive a feedback from the user over the displayed set of recommendation results. The feedback may be one of a positive feedback or a negative feedback. The recommendation system 102 may be configured to update the training dataset based on at least the user selection, the feedback, and the input natural language query from the user. After a predefined period (e.g., a certain time is passed or a certain number of feedback is received), the recommendation system 102 may be configured to retrain the ML model 102A based on the updated training dataset and redeploy the retrained ML model 102A.

It should be noted here that the communication between the recommendation system 102, the web API repository 104, and the user device 108 may be performed via the communication network 110. The communication network 110 may include a communication medium through which the recommendation system 102 may access the web API repository 104 via the web and communicate with the user device 108 and/or different devices (not shown). Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the recommendation system 102 without departing from the scope of the present disclosure. For example, the recommendation system 102 may be a distributed network of servers which may collectively provide the set of recommendation results to the user device 108 based on a user request in the form of the input natural language query.

Figure 2:
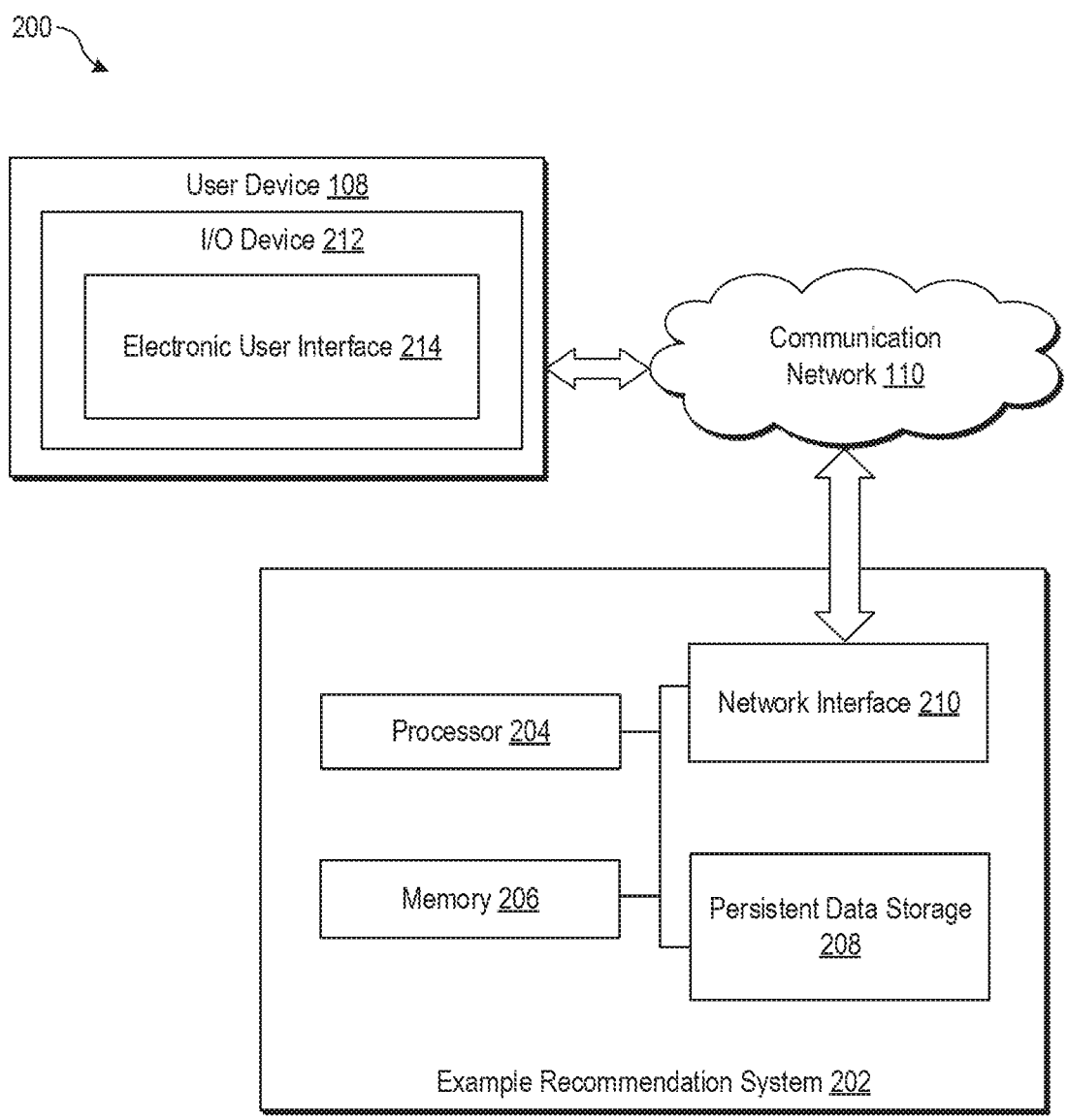
FIG. 2 is a block diagram of an example recommendation system for recommending web APIs and associated endpoints.

FIG. 2 is a block diagram of an example recommendation system for recommending web APIs and associated endpoints, arranged in accordance with at least one embodiment described in the present disclosure. FIG. 2 is explained in conjunction with elements from FIG. 1. With reference to FIG. 2, there is shown a block diagram 200 of an example recommendation system 202 of FIG. 1. The example recommendation system 202 may include a processor 204, a memory 206, a persistent data storage 208, and a network interface 210. There is further shown the user device 108 communicatively coupled to the example recommendation system 202, via the communication network 110. The user device 108 may include an input/output (I/O) device 212 which includes an electronic user interface 214. The example recommendation system 202 may correspond to the recommendation system 102 of FIG. 1.

The processor 204 may comprise suitable logic, circuitry, and/or interfaces that may be configured to execute program instructions associated with different operations to be executed by the example recommendation system 202. For example, some of the operations may include extracting information associated with web APIs from the web API repository 104, constructing a training dataset, obtaining the ML model 102a based on the training dataset, and outputting recommendation results using obtained ML model 102a, and the like. The processor 204 may include any suitable special-purpose or general-purpose computer, computing entity, or processing device, including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 204 may include any number of processors configured to, individually or collectively, perform or direct performance of any number of operations of the example recommendation system 202, as described in the present disclosure. Additionally, one or more of the processors may be present on one or more different electronic devices, such as different servers.

In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, and/or interfaces that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the example recommendation system 202.

The persistent data storage 208 may comprise suitable logic, circuitry, and/or interfaces that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the example recommendation system 202.

The network interface 210 may comprise suitable logic, circuitry, interfaces, and/or code that may be configured to establish a communication among the example recommendation system 202, the web API repository 104, and the user device 108, via the communication network 110. The network interface 210 may be implemented by use of various known technologies to support wired or wireless communication of the example recommendation system 202, via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

The I/O device 212 may include suitable logic, circuitry, interfaces, and/or code that may be configured to receive a user input. The I/O device 212 may be further configured to provide an output in response to the user input. The I/O device 212 may include various input and output devices, which may be configured to communicate with the processor 204 and other components, such as the network interface 210. Examples of the input devices may include, but are not limited to, a touch screen, a keyboard, a mouse, a joystick, and/or a microphone. Examples of the output devices may include, but are not limited to, a display device and a speaker.

The electronic UI 214 may be any suitable human-machine interface (HMI) that may enable a user (such as the user 112) to interact with the user device 108 and/or other systems, such as the example recommendation system 202. The electronic UI 214 may implement one or more UI features, such as tactile feature (touch), visual feature (sight), an auditory feature (sound), or a composite feature. In certain embodiments, the electronic UI may be graphical user interface or a command line interface that enables a developer (i.e. a user) to submit an input natural language query to the example recommendation system 202 and receive a set of recommendation results.

In certain embodiments, the example recommendation system 202 may be divided into a front end subsystem and a backend subsystem. The front end subsystem may be solely configured to receive requests/instructions from one or more of third party servers, web servers, client machine, the user device 108, and the backend subsystem. These requests may be communicated back to the backend subsystem, which may be configured to act upon these requests. For example, in case the example recommendation system 202 includes multiple servers, few of the servers may be front-end servers configured to relay the requests/instructions to remaining servers associated with the backend subsystem. Modifications, additions, or omissions may be made to the example recommendation system 202 without departing from the scope of the present disclosure. For example, in some embodiments, the example recommendation system 202 may include any number of other components that may not be explicitly illustrated or described.

Figure 3:
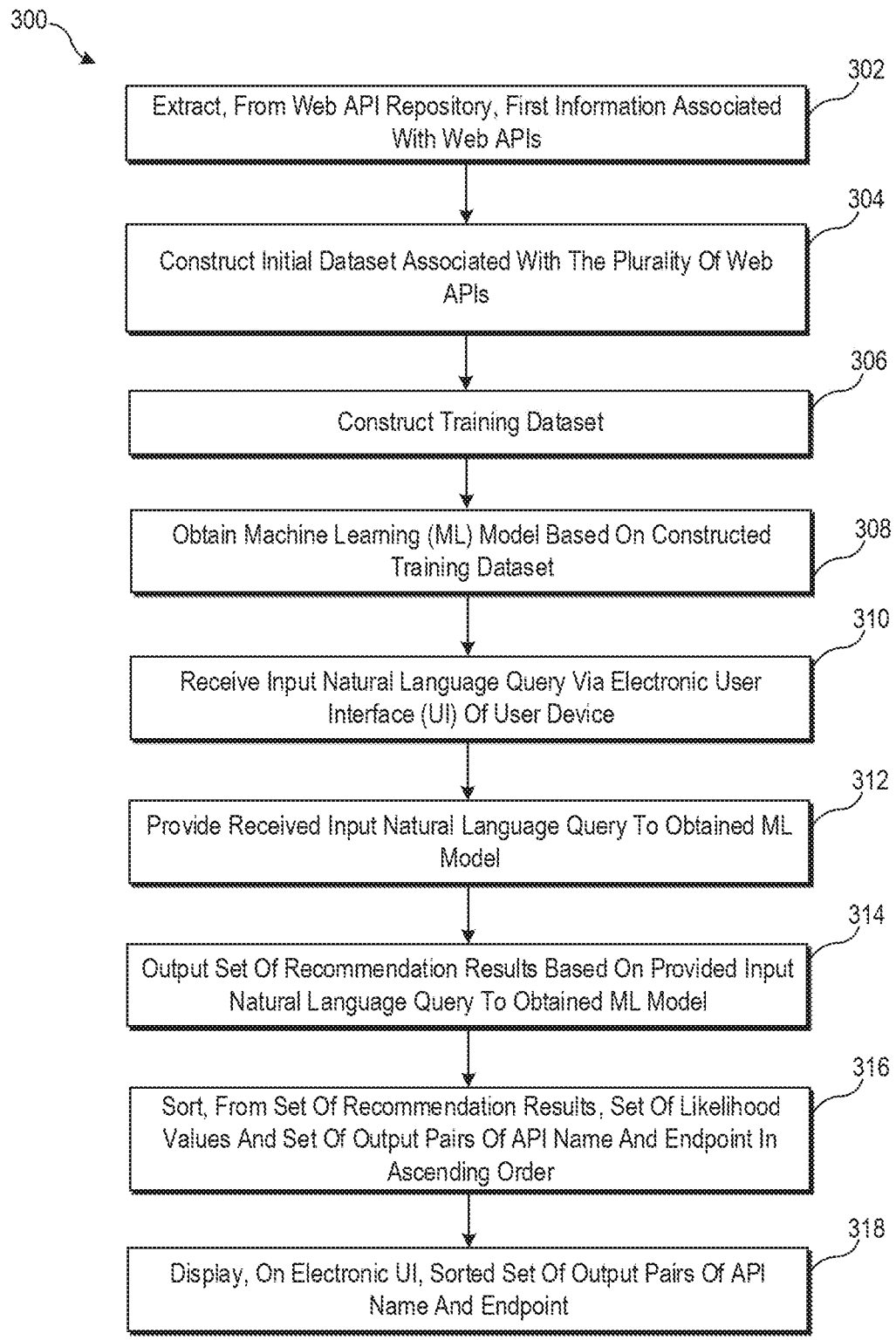
FIG. 3 illustrates a flowchart of an example method of recommending web APIs and associated endpoints.

FIG. 3 illustrates a flowchart of an example method of recommending web APIs and associated endpoints, according to at least one embodiment described in the present disclosure. FIG. 3 is explained in conjunction with elements from FIG. 1 and FIG. 2. With reference to FIG. 3, there is shown a flowchart 300. The method illustrated in the flowchart 300 may start at 302 and may be performed by any suitable system, apparatus, or device, such as by the example recommendation system 202 of FIG. 2.

At 302, first information associated with a plurality of web APIs may be extracted from the web API repository 104. In one or more embodiments, the processor 204 may be configured to extract the first information associated with the plurality of web APIs from the web API repository 104. The extracted first information may include, but is not limited to, an API description, an endpoint name, an endpoint description, an input parameter description, an output parameter description, a primary category, a secondary category, one or more tags, and an API title associated with each web API of the plurality of web APIs.

The web API repository 104 may include the plurality of documents 106 associated with the plurality of web APIs. Each document of the plurality of documents 106 may be associated with a file type. Examples of the document type may include, but are not limited to, Hyper Text Markup Language (HTML), Portable Document Format (PDF), Unicode plain text (TxT), Open XML document (DOCX), Comma Separated Values (CSV), Extensible Markup Language (XML), and Rich Text document (RTF). In certain embodiments, each document of the plurality of documents 106 may include information mapped to a plurality of fields associated with a corresponding web API of the plurality of web APIs. In each document, the plurality of fields may include, for example, an API description field, an endpoint description field, an API title field, and fields for input/output parameters, a primary category, a secondary category, and one or more tags.

In one or more embodiments, the processor 204 may retrieve a first document of the plurality of documents 106 from the web API repository 104 and may use machine learning methods to identify functionalities of a first web API specified in the retrieved document. The processor 204 may be configured to determine an ontology for the first web API. The ontology may be defined based on any format, such as the Resource Description Framework (RDF) format. Using RDF as an example, the RDF may be parsed by different methods, such as SPARQL query processing method which is set forth by RDF Data Access Working Group (DAWG) of the World Wide Web Consortium (W3C).

In one or more embodiments, the processor 204 may be configured to tokenize each document of the plurality of documents 106. In tokenization, a stream of text (e.g., a sentence) may be broken down into words, phrases, symbols, or other meaningful elements which are also referred to as tokens. The list of tokens may become input for further processing, such as parsing or text mining. The processor 204 may be further configured to parse each document of the plurality of documents 106 in the web API repository 104. Further, in each document of the plurality of documents 106, the processor 204 may be configured to identify information associated with a corresponding web API based on the parsing of a corresponding document of the plurality of documents 106. An example of the identified information is provided in FIGS. 4A, 4B, and 4C. The processor 204 may be further configured to extract the first information based on the identified information in each document of the plurality of documents 106.

For example, the identified information from a document for a graph API of a social media platform may be given as follows:

| | |
|---|---|
| API descriptions | API for managing Social Media Account Comments. At our core is the social graph; people and the connections they have to everything they care about. The Graph API presents a simple, consistent view of our social graph, uniformly representing objects in the graph (e.g., people, photos, events, and pages) and the connections between them (e.g., friend relationships, shared content, and photo tags). Public information can be accessed without a developer key/application key, but is required for private data access. |
| Endpoint | GET/comments |
| Endpoint descriptions | A comment can be made on various types of content on Social Media Page |
| Input/Output Parameter descriptions | attachment - Link or photo attached to the comment<br>can_comment - Whether the viewer can reply to this comment<br>can_hide - Whether the viewer can hide this comment<br>can_like - Whether the viewer can like this comment<br>can_remove - Whether the viewer can remove this comment |
| Primary Category | Social |
| Secondary Category | Demographics |
| API title | Graph (Comment) API |
| ... | ... |

At 304, an initial dataset associated with the plurality of web APIs may be constructed by performing a first set of information processing operations on the extracted first information. In one or more embodiments, the processor 204 may be configured to construct the initial dataset by performing the first set of information processing operations on the extracted first information. The first set of information processing operations may include, but are not limited to, sentence tokenization, sentence filtering (e.g., short sentences, stop words, special characters, before/after space, etc.), and word stemming. The details of the first set of information processing operations are provided, for example, in FIG. 5.

The initial dataset may include a table which may be populated with a plurality of sentences obtained after application of the first set of information processing operations on the extracted first information. The table may be divided into three columns, i.e. a data source, an API name, and an Endpoint. Each sentence of the plurality of sentences may populate a corresponding row of the table and may be mapped to an API name and an endpoint for the API name. In some cases, the endpoint in a row may be set as "Not Available" (N/A) when a correspondence/relationship of the endpoint to a sentence in the row may be uncertain. An example template of the initial dataset is provided in Table 1, as follows:

TABLE 1

Example template: Initial Dataset

| Data Source | API Name | Endpoint |
|---|---|---|
| <API Description> | <API Name> | N/A |
| <Endpoint Description> | <API Name> | <Endpoint> |

TABLE 1-continued

Example template: Initial Dataset

| Data Source | API Name | Endpoint |
|---|---|---|
| <Input/output Parameter description> | <API Name> | <Endpoint> |
| <Primary category>, <Secondary category> <keywords>, <tags> | <API Name> | N/A |
| <API Title> | <API Name> | N/A |
| ... | ... | ... |

For example, with reference to the example on graph API, the initial dataset may be given by Table 2, as follows:

TABLE 2

Example Initial Dataset

| Data Source | Graph API | Endpoint |
|---|---|---|
| API for managing Social Media Account Comments | Graph API | /comments |
| The Graph API presents a simple, consistent view of our social graph, uniformly representing objects in the graph | Graph API | /comments |
| Public information can be accessed without a developer key application key, but is required for private data access | Graph API | N/A |
| A comment can be made on various types of content on Social Media Page | Graph API | /comments |
| Link or photo attached to the comment | Graph API | /comments |
| Whether the viewer can reply to this comment | Graph API | /comments |
| Social Demographics | Graph API | /comments |
| ... | ... | ... |

At 306, a training dataset may be constructed by performing a second set of information processing operations on the constructed initial dataset. In one or more embodiments, the processor 204 may be configured to construct the training dataset by performing the second set of information processing operations on the constructed initial dataset. The constructed training dataset may correspond to a query corpus and may include a plurality of natural language queries, a plurality of web API names, and a plurality of endpoints associated with the plurality of web API names. The second set of information processing operations may include POS tagging and generating syntactic dependency tree of each sentence of the plurality of sentences in the constructed initial dataset. Further, the second set of information processing operations may include synthesis/formation of the plurality of natural language queries based on the POS tagging and the syntactic dependency tree of each sentence of the plurality of sentences in the constructed initial dataset. The details of the second set of information processing operations are provided, for example, in FIG. 6.

In one or more embodiments, the constructed training dataset may include a set of fields, such as a query field, a web API name field, and an endpoint field. The plurality of natural language queries may be mapped under the query field of the constructed training dataset. Similarly, the plurality of web API names and the plurality of endpoints may be may be mapped under the web API name field and the endpoint field, respectively, of the constructed training dataset.

The plurality of natural language queries may include, but are not limited to, a set of question-type queries, a set of command-type queries, a set of keyword-type queries, and a set of title-type queries. Each natural language query may be formed/synthesized based on a plurality of sentences in the constructed initial dataset. The details of the formation of the plurality of natural language queries are provided, for example, in FIG. 6. An example template for the training dataset is given by Table 3, as follows:

TABLE 3

Example Template - Training Dataset

| Query | Web API Name | Endpoint |
| --- | --- | --- |
| <Natural Language Query> | <API Name> | <Endpoint> |
| <Natural Language Query> | <API Name> | <Endpoint> |
| <Natural Language Query> | <API Name> | <Endpoint> |
| ... | ... | ... |

For example, with reference to the example on graph API, the constructed training dataset may be given by Table 4, as follows:

TABLE 4

Example Training Dataset

| Query | Web API Name | Endpoint |
| --- | --- | --- |
| How to manage social media account | Graph API | /comments |
| Get a view of social activities | Graph API | /comments |
| Get comments made on social media pages | Graph API | /comments |
| How to link a photo to a comment | Graph API | /comments |
| Comment photos | Graph API | /comments |
| ... | ... | ... |

At 308, the ML model 102a may be obtained based on the constructed training dataset. More specifically, the ML model 102a may be trained based on the constructed training dataset. In one or more embodiments, the processor 204 may be configured to obtain the ML model 102a based on the constructed training dataset. The ML model 102a may correspond to a deep learning model which may be trained to output a set of recommendation results, including a plurality of output pairs of web API name and endpoint based on an input natural language query to the ML model 102a. The output set of recommendation results may also include a set of likelihood values (also referred to as a set of confidence scores) corresponding to the plurality of output pairs of web API name and endpoint. A higher likelihood value for a recommendation result may be indicative of a closer match of the recommendation result to an input natural language query from the user. The details of architecture of the ML model 102a and a set of operations performed for the training of the ML model 102a are described, for example, in FIG. 8.

In one or more embodiments, the ML model 102a may be a dual-stage learning model which includes a first stage and a second stage. The first stage may include a first model and a second model arranged in a parallel configuration. The first model may include a first embedding layer and a first Bi-Long Short-Term Memory (Bi-LSTM) network coupled to the first embedding layer. Similarly, the second model may include a second embedding layer and a second Bi-LSTM network coupled to the second embedding layer. The second stage may include an Artificial Neural Network (ANN) coupled to corresponding output layers of the first model and the second model. The first model may be trained on a pair of natural language query and web API name, and the second model may be trained on a pair of natural language query and endpoint name. The training operation may be performed till a training error or a cost function for the first model and the second model is minimized. Once the first model and the second model are trained, the entire first stage and the second stage is collectively trained on sets, including a combination of natural language queries, web API names, and endpoints specified in the training dataset. During the training of the second stage, the weights of the corresponding layers in the first model and the second model (e.g. 808A, 808B, 808C, 810A, 810B, and 810C) may be frozen (set to not trainable). Those weights have already been optimized during the first stage training, so they may not get trained again during the training of the second stage.

In one or more embodiments, the ML model 102a (i.e. a trained ML model 102a) may be deployed on the example recommendation system 202. Once deployed, the ML model 102a may be configured to receive input natural language queries from users who may access the electronic UI 214 to submit the input natural language queries to the example recommendation system 202.

At 310, an input natural language query may be received via the electronic UI 214 of the user device 108. In one or more embodiments, the processor 204 may be configured to receive the input natural language query via the electronic UI 214 of the user device 108. There is no constraint for the format of input natural language query. It may be one of a question-type query, a command-type query, a keyword-type query, or an API title-type query.

The input natural language query may include one or more words indicative of functionalities, usage, application area(s), or API-provider(s) associated with one or more web APIs of the plurality of web APIs. In some instances, the one or more words may be same as words used in documents maintained in the web API repository 104 to describe the functionalities, the usage, the application area(s), or the API-provider(s). In other instances, the one or more words may bear a contextual/semantic similarity to words used in the documents to describe the functionalities, the usage, the application area(s), or the API-provider(s). For example, a developer may provide an input natural language query, as follows: "Get Glucose". The input natural language query may be provided to search for one or more web APIs having at least functionalities, usage, application area(s), or API provider(s) associated with the word "Glucose". In this case, the developer may be looking for a web API which may be used to log blood sugar from raw health data in their respective applications, products, or services.

At 312, the received input natural language query may be provided to the ML model 102a (i.e. the trained ML model 102a). In one or more embodiments, the processor 204 may be configured to provide the received input natural language query to the ML model 102a.

At 314, a set of recommendation results may be outputted based on the provided input natural language query to the obtained ML model 102a. In one or more embodiments, the obtained ML model 102a may be configured to output the set of recommendation results based on the provided input natural language query to the obtained ML model 102a. Each recommendation result may include a specific API name of the plurality of web API names and a specific endpoint of the plurality of endpoints.

In one or more embodiments, the set of recommendation results may include a set of likelihood values and a set of output pairs of API name and endpoint corresponding to the set of likelihood values. The set of likelihood values may be indicative of a confidence of a classifier of the ML model 102a for a match of the set of output pairs of API name and endpoint with the input natural language query. An example of the set of recommendation results is provided in FIG. 10B.

At 316, the set of likelihood values and the set of output pairs of API name and endpoint may be sorted in an ascending order. In one or more embodiments, the processor 204 may be configured to sort the set of likelihood values and the set of output pairs of API name and endpoint in ascending order. The ML model 102a may output a likelihood value for each output pair of the set of output pairs of API name and endpoint. The set of output pairs of API name and endpoint may be sorted and ranked in ascending order of the set of likelihood values. A higher rank may be indicative of a larger likelihood that a corresponding output pair of API name and endpoint is relevant in light of the provided input natural language query.

At 318, the sorted set of output pairs of API name and endpoint may be displayed on the electronic UI 214. An example of display of the set of recommendation results on the electronic UI 214 is provided in FIG. 10B. In one or more embodiments, the user device 108 may be configured to display the sorted set of output pairs of API name and endpoint on the electronic UI 214 of the user device 108. Further operations performed by the example recommendation system 202 are provided in detail, for example, in FIGS. 5, 6, 8, 9A, and 9B.

The control passes to end. Although the flowchart 300 is illustrated as discrete operations, such as 302, 304, 306, 308, 310, 312, 314, 316, and 318. However, in certain embodiments, such discrete operations may be further divided into additional operations, combined into fewer operations, or eliminated, depending on the particular implementation without detracting from the essence of the disclosed embodiments.

Figure 4B:
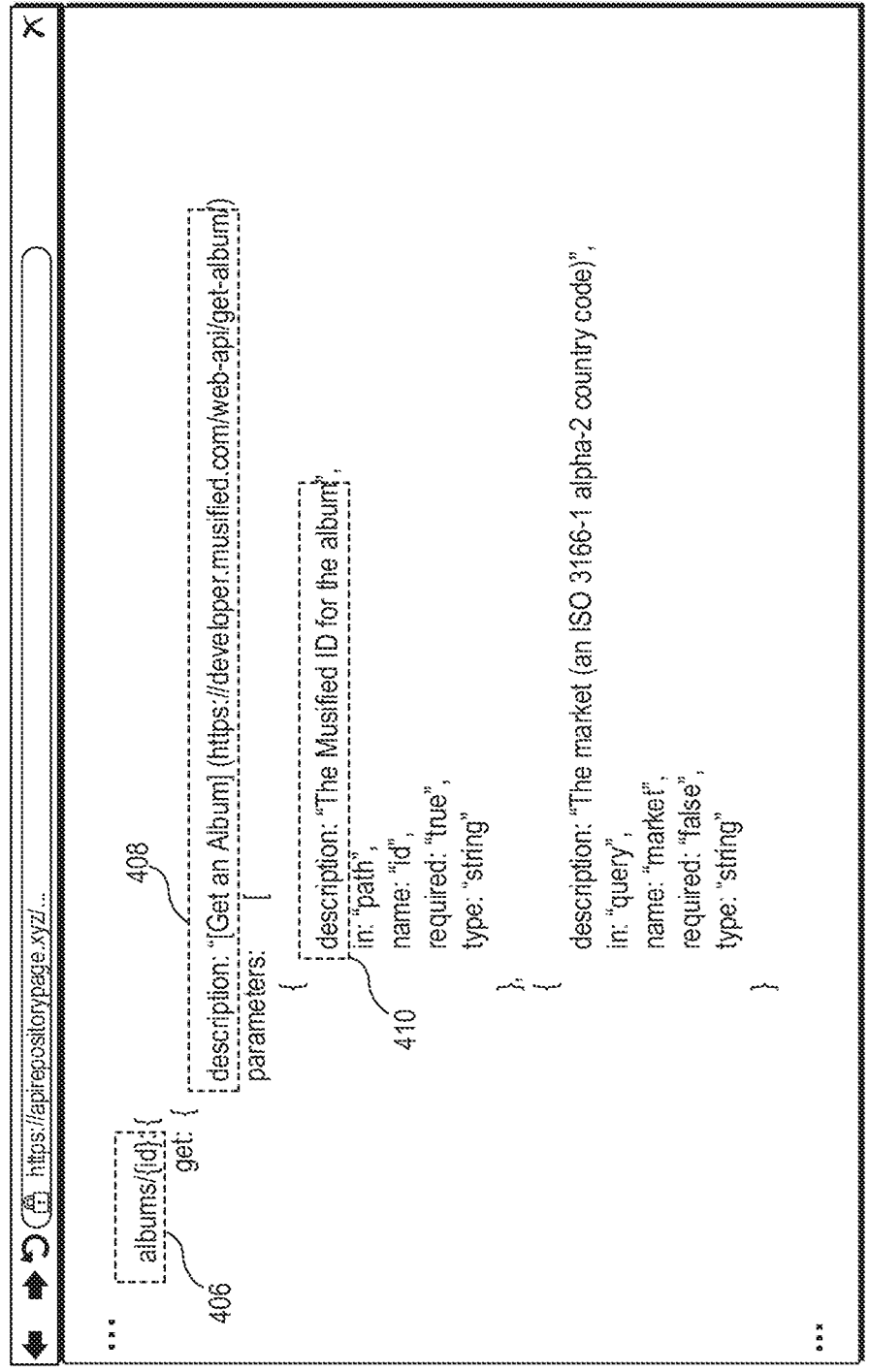

FIGS. 4A, 4B, and 4C, collectively illustrate example documents in a web API repository, according to at least one embodiment described in the present disclosure. FIGS. 4A, 4B, and 4C are explained in conjunction with elements from FIG. 1, FIG. 2, and FIG. 3. With reference to FIGS. 4A, 4B, and 4C, there is shown a set of documents including a first document 400A, a second document 400B, and a third document 400C for an example web API, to be called Musified API for description purposes here. Each of the first document 400A, the second document 400B, and the third document 400C may be retrieved from an example web API repository.

The first document 400A may be a web document belonging to the Musified API and may include a first portion of information associated with the Musified API within a markup/code. More specifically, the first portion of the information associated with the Musified API may be specified by one or more markup tags and/or markup categories on the first document 400A. As shown, the first document 400A includes an API title 402 as "title: Musified" and an API description 404 as "description: Our Web API lets your applications fetch data from the Musified music catalog and manage user's playlists and saved music."

The second document 400B may be also a web document belonging to the Musified API and may include a second portion of information associated with the Musified API within a markup/code. More specifically, the second portion of the information associated with the Musified API may be also specified by one or more markup tags and/or markup categories on the second document 400B. As shown, the second document 400B includes an endpoint name/endpoint 406 as "albums/{id}", an endpoint description 408 as "[Get an album] (https://developer.musified.com/web-api/get-album/)" and an API input/output parameter description 410 as "The Musified ID for the description".

The third document may be a web page belonging to the Musified API and may include a third portion of the information associated with the Musified API. More specifically, the third portion of the information associated with the Musified API may be specified under headings, one or more tags, and/or categories. As shown, the second document 400B includes one or more API tags 412 as "Music" and "Data Mining", an API description 414 as "The Musified Web API allows developers to use their application to get data from the Musified music catalog. The endpoints result in JSON format providing information such as artists, albums, and tracks directly from the Musified catalog. Depending on user's authorization, the API can also provide developers access to user-related data, i.e. playlists and music saved in user's library", and a primary/secondary category 416 as "Music" and "Data Mining".

In one or more embodiments, the processor 204 may be configured to process each of the first document 400A, the second document 400B, and the third document 400C to extract the information associated with the Musified API. The extracted information may include the API title 402, the API description 404, the endpoint name/endpoint 406, the endpoint description 408, the input/output parameter description 410, the one or more tags 412, the API description 414, and the primary/secondary category 416. The extracted information may be considered as part of the first information obtained for the plurality of web APIs.

Figure 5:
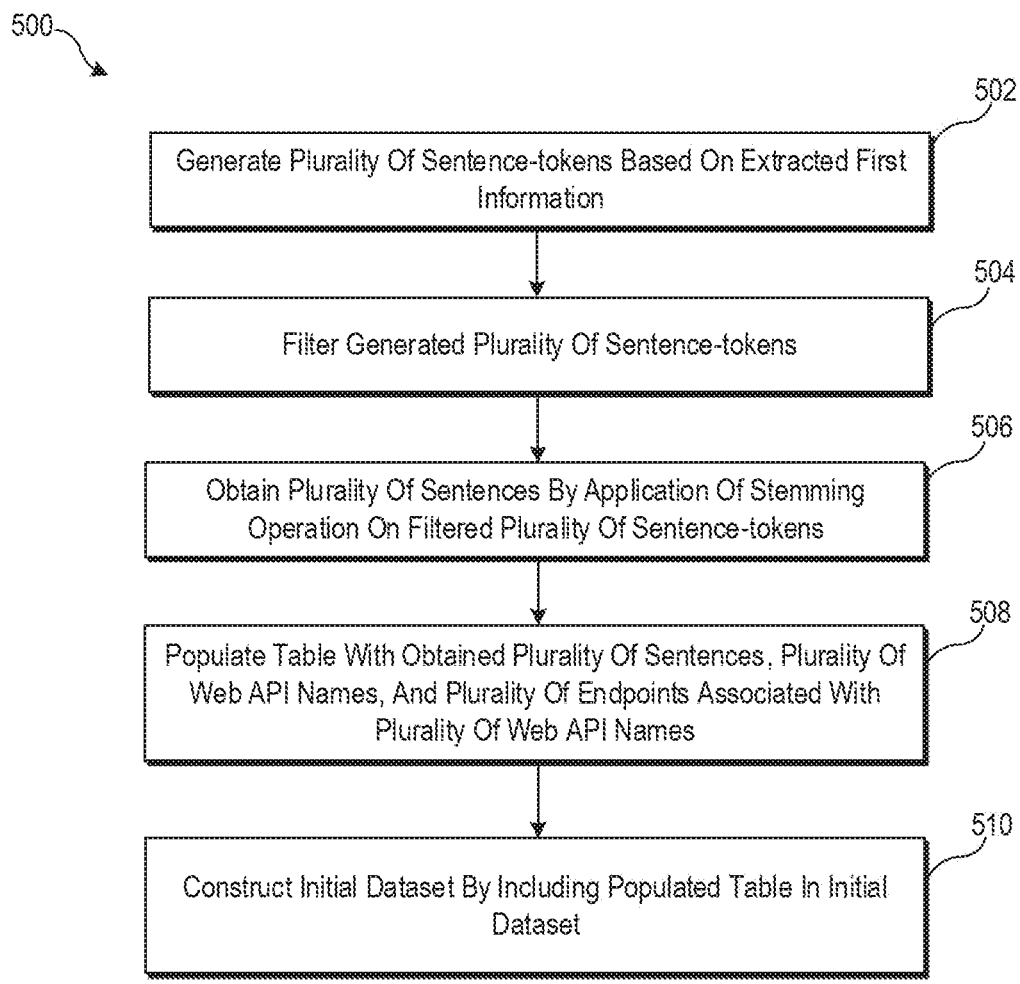
FIG. 5 illustrates a flowchart of an example method of constructing an initial dataset using information associated with web APIs.

FIG. 5 illustrates a flowchart of an example method of constructing an initial dataset using information associated with web APIs, according to at least one embodiment described in the present disclosure. FIG. 5 is explained in conjunction with elements from FIGS. 1, 2, 3, 4A, 4B, and 4C. With reference to FIG. 5, there is shown a flowchart 500. The method illustrated in the flowchart 500 may start at 502 and may be performed by any suitable system, apparatus, or device, such as by the example recommendation system 202 of FIG. 2. The method illustrated in the flowchart 500 may correspond to the first set of information processing operations performed on the extracted first information to construct the initial dataset.

At 502, a plurality of sentence-tokens may be generated based on the extracted first information. In one or more embodiments, the processor 204 may be configured to generate the plurality of sentence-tokens based on the extracted first information. Each sentence-token of the plurality of sentence tokens may be a single sentence obtained after sentence-tokenization of a text portion of the extracted first information.

As an example, a text portion (P) of the extracted first information may be as follows:
P={"API for managing Social Media Account Comments. At our core is the social graph; people and the connections they have to everything they care about. The Graph API presents a simple, consistent view of our social graph, uniformly representing objects in the graph and the connections between them. Public information can be accessed without a developer key/application key, but is required for private data access."}

The sentence tokenization of "P" may provide a set of sentence-tokens ($S_T$), given as follows:
$S_T$={"API for managing Social Media Account Comments", "At our core is the social graph", "people and the connections they have to everything they care about", "The Graph API presents a simple, consistent view of our social graph, uniformly representing objects in the graph and the connections between them", "Public information can be accessed without a developer key/application key, but is required for private data access"}

At 504, the generated plurality of sentence-tokens may be filtered based on removal of one or more of a stopping word, a symbol, a special character, a space between two characters, or a short-description sentence from the generated plurality of sentence-tokens. In one or more embodiments, the processor 204 may be configured to filter the generated plurality of sentence-token based on removal of one or more of a stopping word, a symbol, a special character, a space between two characters, or a short-description sentence from the generated plurality of sentence-tokens.

For example, for a sentence token: "Public information can be accessed without a developer key/application key, but is required for private data access", a filtered sentence token may be as follows:
"Public information can accessed without developer key application key but required private data access"
From the sentence-token, stop words, such as "be", "a", "is", and "for" are removed and special character "/" is removed. Also, before/after space for each word may be removed to obtain the filtered sentence-token.

At 506, a plurality of sentences may be obtained by application of a stemming operation on the filtered plurality of sentence-tokens. In one or more embodiments, the processor 204 may be configured to obtain the plurality of sentence by application of the stemming operation on the filtered plurality of sentence-tokens. In the stemming operation, morphological variants of a root/base word may be obtained for a corresponding word in each sentence of the filtered plurality of sentences. More specifically, the stemming operation may reduce words in each sentence of the filtered plurality of sentences to root words or morphological variants of the root words. For example, the application of the stemming operation on the filtered sentence-token "Public information can accessed without developer key application key but required private data access" may provide a sentence "public inform can access without develop key apply key but require private data access".

At 508, a table may be populated with the obtained plurality of sentences, the plurality of web API names, and the plurality of endpoints associated with the plurality of web API names. In one or more embodiments, the processor 204 may be configured to populate the table with the obtained plurality of sentences, the plurality of web API names, and the plurality of endpoints associated with the plurality of web API names.

At 510, the initial dataset may be constructed by including the populated table in the initial dataset. In one or more embodiments, the processor 204 may be configured to include the populated table in the initial dataset. Further, a second set of information processing operations may be performed on the initial dataset to construct a training dataset for the ML model 102a. The second set of information processing operations are described in detail, for example, in FIG. 6.

Although the flowchart 500 is illustrated as discrete operations, such as 502, 504, 506, 508, and 510. However, in certain embodiments, such discrete operations may be further divided into additional operations, combined into fewer operations, or eliminated, depending on the particular implementation without detracting from the essence of the disclosed embodiments.

Figure 6:
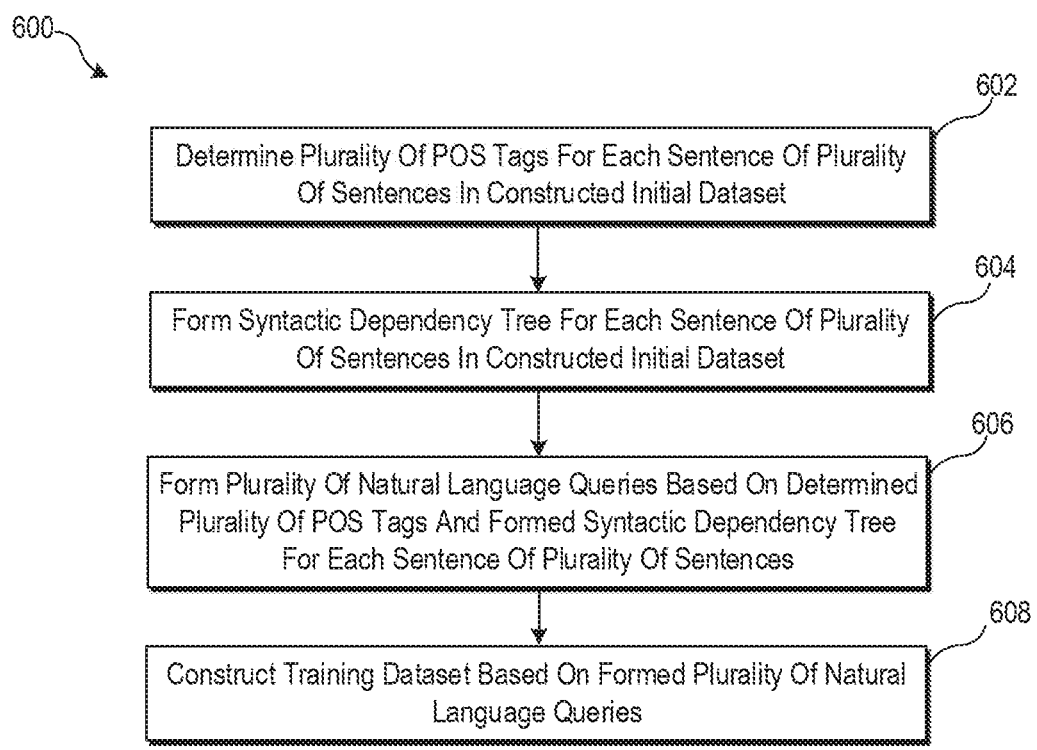
FIG. 6 illustrates a flowchart of an example method for constructing a training dataset using the initial dataset of FIG. 5.

FIG. 6 illustrates a flowchart of an example method for constructing a training dataset using the initial dataset of FIG. 5, according to at least one embodiment described in the present disclosure. FIG. 6 is explained in conjunction with elements from FIGS. 1, 2, 3, 4A, 4B, 4C, and 5. With reference to FIG. 6, there is shown a flowchart 600. The method illustrated in the flowchart 600 may start at 602 and may be performed by any suitable system, apparatus, or device, such as by the example recommendation system 202 of FIG. 2. The method illustrated in the flowchart 600 may correspond to the second set of information processing operations performed on the constructed initial dataset.

At 602, a plurality of Part-of-Speech (POS) tags may be determined for each sentence of the plurality of sentences in the constructed initial dataset. In one or more embodiments, the processor 204 may be configured to determine the plurality of POS tags for each sentence of the plurality of sentences in the constructed initial dataset. In general, POS tagging refers to marking a given word in a sentence as corresponding to a particular part of speech. Examples of a POS tag may include, but is not limited to, adjective (ADJ), adverb (ADV), auxiliary (AUX), coordinating conjunction (CCONJ), determiner (DET), interjection (INTJ), noun (NN), proper noun (PROPN), ad-position (ADP), Symbol (SYM), Proper Noun Singular (NNP), punctuation (PUNCT), subordinating conjunction (SCONJ), and other (X). An example plurality of POS tags is provided for an example sentence in FIG. 7.

For example, a sentence in the constructed initial dataset may be given as follows: "Public information can be accessed without a developer key". The plurality of POS tags for the sentence may be given by Table 5, as follows:

TABLE 5

| Example of POS tags | | |
| --- | --- | --- |
| POS Tag | Part of Speech | Word |
| NNP | Proper Noun Singular | Public |
| NN | Noun | Information |
| MD | Modal | Can |
| VB | Verb | Be |
| VBN | Verb Past Participle | Accessed |
| IN | Preposition | Without |
| DET | Determiner | A |
| NN | Noun | Developer |
| NN | Noun | Key |

At 604, a syntactic dependency tree may be formed for each sentence of the plurality of sentences in the constructed initial dataset. In one or more embodiments, the processor 204 may be configured to form the syntactic dependency tree for each sentence of the plurality of sentences. In general, relations among a set of tokens in a sentence can be often represented by word-to-word grammar relationships which may be referred to as dependencies. These dependencies may be further represented by a dependency tree which describes a notion that words in a sentence are connected to each other by directed links which describe the relationship possessed by the connected words. An example syntactic dependency tree is provided in FIG. 7.

The relationships among tokens of a sentence in the syntactic dependency tree may be described by relations. An example table of relations for the syntactic dependency tree is provided in Table 6, as follows:

TABLE 6

Example Relations

| Relations | Description |
| --- | --- |
| NSUBJ | Nominal Subject |
| DOBJ | Direct Object |
| IOBJ | Clausal Complement |
| CCOMP | Clausal Complement |
| NMOD | Nominal Modifier |
| DET | Determiner |
| CASE | Prepositions/Postpositions |
| CONJ | Conjunctions |

At 606, the plurality of natural language queries may be formed based on the determined plurality of POS tags and the formed syntactic dependency tree for each sentence of the plurality of sentences. In one or more embodiments, the processor 204 may be configured to form the plurality of natural language queries based on the determined plurality of POS tags and the formed syntactic dependency tree for each sentence of the plurality of sentences. Each natural language query may be formed to mimic a possible input natural language query from a user (such as a developer) who may be looking up for a web API offering the desired functionality.

The plurality of natural language queries may include, but are not limited to, a set of question-type queries, a set of command-type queries, a set of keyword-type queries, and a set of title-type queries. Herein, the method for forming the plurality of natural language queries is described.

In one or more embodiments, the processor 204 may be configured to form a first question-type query from a first sentence of the plurality of sentences. The first question type query may be formed based on a determination that a root node in the formed syntactic dependency tree for the first sentence is a verb in the determined plurality of POS tags for the first sentence. As an example, the first question-type query may be a rule-based complete question-type query formed based on the API description and the endpoint description specified in the constructed initial dataset.

If 'ROOT' (i.e. root node in dependency tree) is 'VB' (i.e. a verb) for the first sentence "get weather information based on location", then the corresponding first question-type query may be given as "How to"+'VB'+ remaining sentence?" i.e. "How to get weather information based on location?"

As another example, the first question-type query may be a rule-based simplified question formed based on the API description and the endpoint description specified in the constructed initial dataset, as follows.

If 'ROOT' is 'VB' for the first sentence "get weather information based on location", then the corresponding first question-type query may be given as "How to"+ 'VB'+its 'dobj NOUN phase'?" i.e. "How to get weather information?"

In one or more embodiments, the processor 204 may be configured to form a second question-type query from a second sentence of the plurality of sentences. The second question-type query may be formed based on a determination that a subject in the second sentence is a nominal subject in the formed syntactic dependency tree for the second sentence and the subject is a verb in the determined plurality of POS tags for the second sentence. As an example, the second question-type query may also be a rule-based complete question-type query formed based on the API description and the endpoint description specified in the constructed initial dataset, as follows.

If (subject.dep)==nsubj and subject.head.pos==VERB for the second sentence "this API can get the you2tube playlist according to . . . ", then the second question-type query may be given as "What API"+'VB'+remaining sentence?" i.e. "what API can get the you2tube playlist according to . . . ?".

As another example, the second question-type query may be a rule-based simplified question-type query formed based on the API description and the endpoint description specified in the constructed initial dataset.

If subject.dep==nsubj and subject.head.pos==VERB for the second sentence "this API can get the youtube playlist according to . . . ", then the corresponding second question-type query may be given as "What API"+'VB'+its 'dobj NOUN phrase'?" i.e. "what API can get youtube playlist?"

In one or more embodiments, the processor 204 may be configured to form a third question-type query based on at least the input parameter description or the output parameter description in the constructed initial dataset. As an example, the third question-type query may be "What API can take input <input descriptions> [and generate output <output descriptions>]?" where the output parameter description may be optional if there is no output parameter description.

In one or more embodiments, other question-type queries may be formulated based on the API description and the endpoint description in the initial dataset. For example, some question-type queries may be formulated considering that users' questions are very detailed. In such cases, one or more sentences of the API description or the endpoint description in the constructed initial dataset may be directly translated. Also, some question-type queries may be formulated considering that most users are likely to enter a short or simplified question, rather than a long and detailed question.

In one or more embodiments, the processor 204 may be configured to form a first command-type query from the first sentence of the plurality of sentences. The first command-type query may be formed based on a determination that a root node in the formed syntactic dependency tree for the first sentence is a verb in the determined plurality of POS tags for the first sentence. As an example, the first command-type query may be a rule-based long command-type query, as follows:

If 'ROOT' (i.e. root node in dependency tree) is 'VB' (i.e. a verb) for the first sentence "get weather information based on location", then the corresponding first command-type query may be same as the first sentence.

As another example, the first command-type query may be a rule-based short command-type query, as follows:

If 'ROOT' is 'VB' for the first sentence "get weather information based on location", then the corresponding first command-type query may be given as "VB+its dobj NOUN phrase" i.e. "get weather information".

In one or more embodiments, the processor 204 may be configured to form a second command-type query from the second sentence of the plurality of sentences. The second command-type query may be formed based on a determination that a subject in the second sentence is a nominal subject in the formed syntactic dependency tree for the second sentence and the subject is a verb in the determined plurality of POS tags for the second sentence. As an example, the second command-type query may be a rule-based long command-type query, as follows:
   If (subject.dep)=nsubj and subject.head.pos=VERB for the second sentence "this API can get the you2tube playlist according to . . . ", then the second command-type query may be given as "VB"+its noun phrase", i.e. "get you2tube playlist".
   As another example, the second question-type query may be a rule-based short command-type query, as follows:
   If (subject.dep)=nsubj and subject.head.pos=VERB for the second sentence "this API can get the you2tube playlist according to . . . ", then the second command-type query may be given as "VB"+its noun phrase", i.e. "get you2tube playlist".

In one or more embodiments, the processor 204 may be configured to form a third command-type query based on an API mash-up description on a web document associated with a web API mash-up. For example, the web document may be a web page of a crowdsourcing knowledge website and may include the API mash-up description provided under "How it Works" section of the web document. The processor 204 may be configured to extract the API mash-up description and form the third command-type query directly from the extracted API mash-up description.

In one or more embodiments, the processor 204 may be configured to form a fourth command-type query based on the API description on an applet description document associated with a web API of the plurality of web APIs. As an example, the applet description document may be a web page of a crowdsourcing knowledge website and may include the API description. In such instances, the fourth command-type query may be formed by directly using the API descriptions from the applet description document.

In one or more embodiments, the processor 204 may be configured to form a fifth command-type query based on a trigger sentence segment and an action sentence segment in the API mash-up description on the web document. For example, an API mash-up description may be as follows: "Create note on DoNote from new Calendar events". The mash-up description may be split into the trigger sentence segment "from new Calendar events" and action sentence segment "Create note on DoNote".

As an example, the fifth command-type query may be formed by application of a set of operations on the web document. The "trigger" API and "action" API may be retrieved from the web document and names of trigger API and action API may be cleaned from the retrieved "trigger" API and "action" API. A phrase (or a span of words) of API mash-up description may be matched with trigger name or action name. A dependency parsing operation may be applied on each sentence of the API mash-up description to obtain a dependency tree. The dependency tree may be traced from "trigger" or "action" phrases matched with the trigger name or the action name up to the root of the dependency tree until a node covers partial of another phrase.

In one or more embodiments, other command-type queries may be formulated based on the API description and the endpoint description in the initial dataset. For example, some command-type queries may be formulated considering that users' commands are very detailed. In such cases, one or more sentences of the API description or the endpoint description in the constructed initial dataset may be directly translated. Also, some command-type queries may be formulated considering that most users are likely to enter a short or simplified command, rather than a long and detailed command.

In one or more embodiments, the processor 204 may be configured to extract one or more keywords, one or more noun phrases, one or more primary categories, one or more secondary categories, and one or more tags from each sentence of the plurality of sentences. Thereafter, the processor 204 may be configured to form a keyword-type query based on the extracted one or more keywords, the one or more noun phases, the one or more primary categories, the one or more secondary categories, and the one or more tags. As an example, the one or more keywords may be extracted from each sentence of the plurality of sentences using existing Natural Language Processing (NLP) methods, such as a Rapid Automatic Keyword Extraction (RAKE) method. Similarly, the one or more noun phrases may be extracted using existing NLP libraries, such as SpaCy (or other NLP tools). The keyword-type query may be given by a format as follows: "keyword1, keyword2, keyword3, . . . "

In one or more embodiments, the processor 204 may be configured to form a title-type query based on the API title and one of a question-type query, a command-type query, or a keyword-type query. More specifically, the title-type query may be a combination of the API title with one of the question-type query, the command-type query, or the keyword-type query. The title-type query may be formed to obtain training samples for instances where the input queries from a user carry the API title. As an example, an API title such as Graph may be used to obtain a title-type query: "retrieve comments using Graph".

At 608, a training dataset may be constructed based on the formed plurality of natural language queries. In one or more embodiment, the processor 204 may be configured to construct the training dataset based on the formed plurality of natural language queries. The training dataset may be constructed further based on the formed first question-type query, the formed second question-type query, and the formed third question-type query. The training dataset may be constructed further based on the formed first command-type query, the formed second command-type query, the formed third command-type query, the formed fourth command-type query, and the formed fifth command-type query. The training dataset may be constructed further based on the formed keyword-type query and the formed title-type query. An example template of the training dataset is given by Table 7, as follows:

TABLE 7

Example Template for training dataset

| Query | Web API Name | Endpoint |
|---|---|---|
| <Question-type query> | <API Name> | <Endpoint> |
| <Command-type query> | <API Name> | <Endpoint> |
| <Keyword-type query> | <API Name> | <Endpoint> |
| <Title-type query> | <API Name> | <Endpoint> |
| <Other query-types> | <API Name> | <Endpoint> |
| . . . | . . . | . . . |

Although the flowchart 600 is illustrated as discrete operations, such as 602, 604, 606, and 608. However, in certain embodiments, such discrete operations may be further divided into additional operations, combined into fewer operations, or eliminated, depending on the particular implementation without detracting from the essence of the disclosed embodiments.

Figure 7:
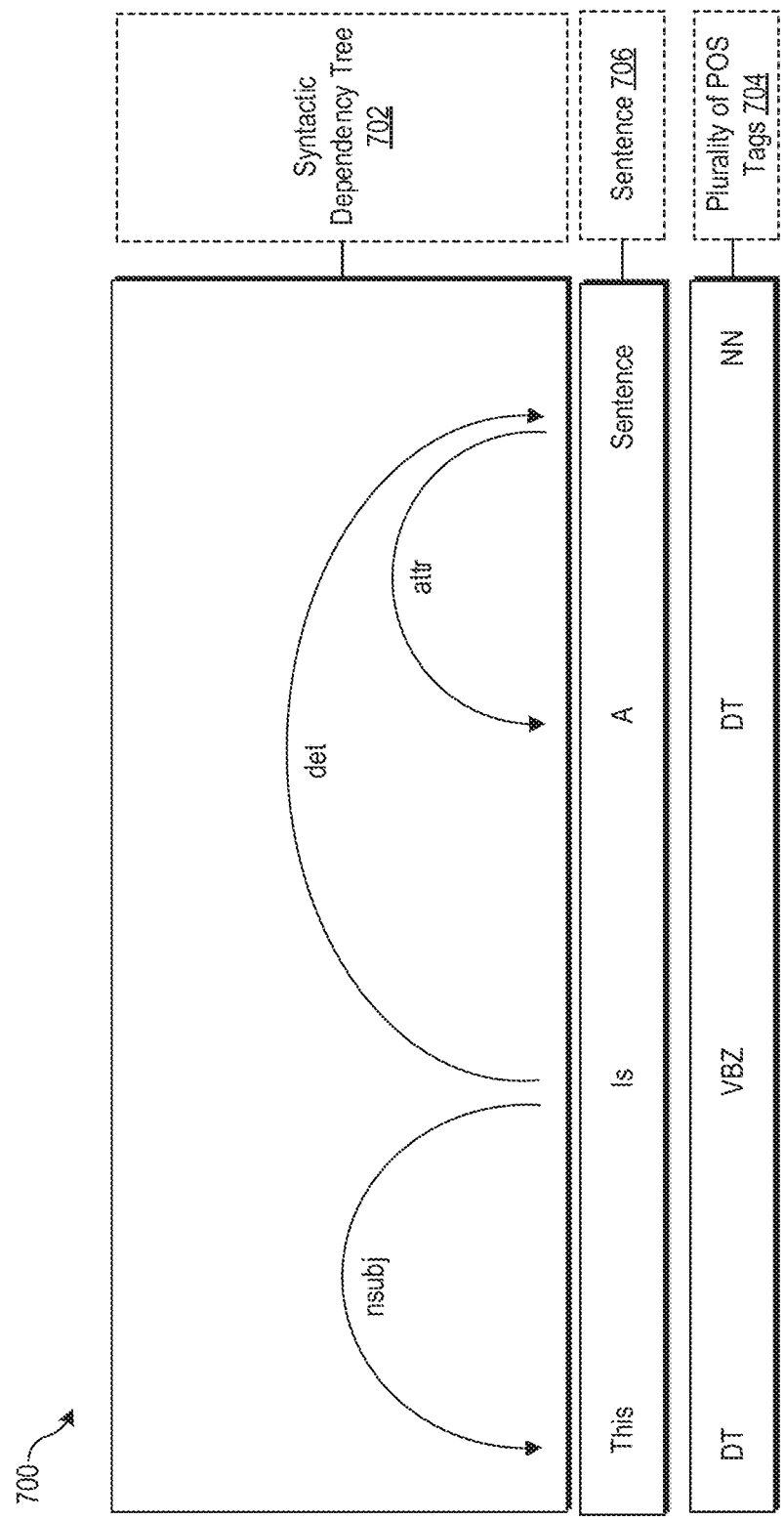
FIG. 7 illustrates an example of a syntactic dependency tree and POS tags for an example sentence.

FIG. 7 illustrates an example of a syntactic dependency tree and POS tags for an example sentence, according to at least one embodiment described in the present disclosure.

FIG. 7 is explained in conjunction with elements from FIGS. 1, 2, 3, 4A, 4B, 4C, 5, and 6. With reference to FIG. 7, there is shown an example 700 of a syntactic dependency tree 702 and a plurality of POS tags 704 for an example sentence 706.

The example sentence 706 may be given as follows: "This is a sentence" and the plurality of POS tags 704 for the example sentence 706 may be given as "This: DT", "Is: VB", "A: DT", and "Sentence: NN". Here, DT, VB, and NN may refer to a determiner, a verb, and a noun.

As shown, "is" is assigned a "VB" POS tag and is the root node of the syntactic dependency tree 702. Other words/tokens in the example sentence 706 may be described by a grammar relation with a parent node or the root node. Thus, "this" is assigned a "DT" POS tag and has a relation of a nominal subject (nsubj) with reference to the root node. Similarly, "sentence" is assigned a "NN" POS tag and has a relation determiner (det) with reference to the root node. Also, the "A" is assigned a "DT" POS tag and has a relation (attr) with reference to a node corresponding to "sentence".

Figure 8:
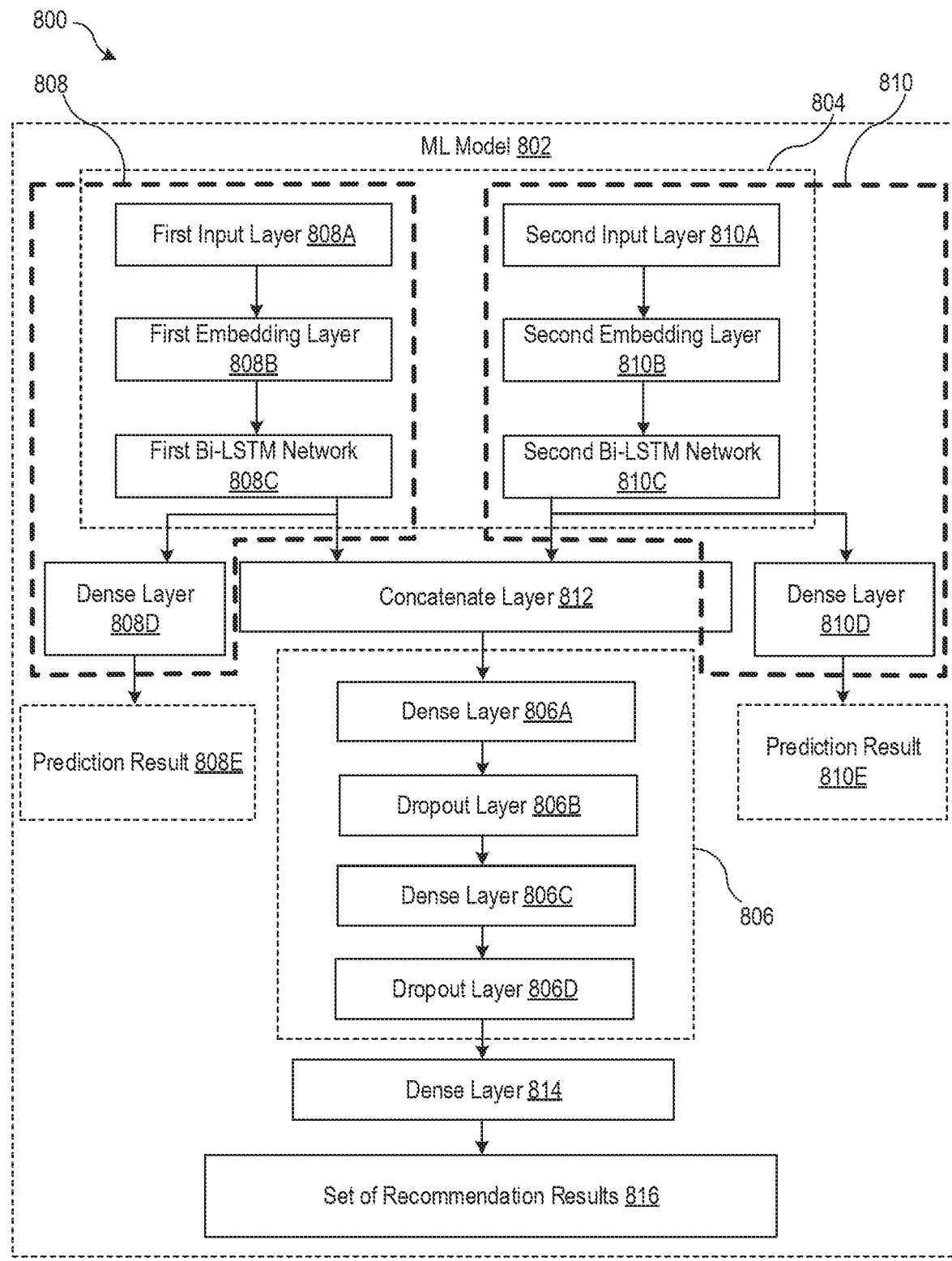
FIG. 8 illustrates a block diagram of an example ML model.

FIG. 8 illustrates a block diagram of an example ML model 802, according to at least one embodiment described in the present disclosure. FIG. 8 is explained in conjunction with elements from FIGS. 1, 2, 3, 4A, 4B, 4C, 5, 6, and 7. With reference to FIG. 8, there is shown a block diagram 800 of an example ML model 802 which may correspond to the ML model 102A.

In one or more embodiments, the example ML model 802 may include electronic data, such as, for example, a software program, code of the software program, libraries, applications, scripts, or other logic or instructions for execution by a processing device, such as the processor 204. The example ML model 802 may include code and routines configured to enable a computing device, such as the processor 204 to perform one or more operations for recommending web API names and associated endpoints for an input natural language query. Additionally or alternatively, the example ML model 802 may be implemented using hardware including a processor, a microprocessor (e.g., to perform or control performance of one or more operations), a field-programmable gate array (FPGA), or an application-specific integrated circuit (ASIC). In some other instances, the example ML model 802 may be implemented using a combination of hardware and software.

The example ML model 802 may be a dual-stage transfer learning model which includes a first stage 804 and a second stage 806. The first stage 804 may include a first model 808 and a second model 810 arranged in a parallel configuration. The second stage 806 may include an Artificial Neural Network (ANN) coupled to corresponding output layers of the first model 808 and the second model 810. In certain embodiments, the output layers of the first stage 804 may be coupled to a concatenate layer 812 which may be further coupled to the second stage 806. The output of the ANN of the second stage 806 may be coupled to a dense layer 814 which may provide a final output of the example ML model 802.

The first model 808 may include a first input layer 808A, a first embedding layer 808B, a first Bi-LSTM network 808C, and a dense layer 808D coupled to the first Bi-LSTM network 808C. The first input layer 808A may be coupled to the first embedding layer 808B which may be coupled to the first Bi-LSTM network 808C. Similarly, the second model 810 may include a second input layer 810A, a second embedding layer 810B, a second Bi-LSTM network 810C, and a dense layer 810D coupled to the second Bi-LSTM network 810C. The second input layer 810A may be coupled to the second embedding layer 810B which may be coupled to the second Bi-LSTM network 810C.

The ANN of the second stage 806 may include one or more dense layers and/or one or more dropout layers. For example, the architecture illustrated in FIG. 8 includes a dense layer 806A, a dropout layer 806B, a dense layer 806C, and a dropout layer 806D. The dense layer 806A may be coupled to the dropout layer 806B which may be coupled to the dense layer 806C. The dense layer 806C may be further coupled to the dropout layer 806D which may be coupled to the dense layer 814.

An example method of training the example ML model 802 is provided herein. In one or more embodiments, the example method may be performed by any suitable system, apparatus, or device, such as by the example recommendation system 202 of FIG. 2. In the example method, a first natural language query of the plurality of natural language queries from the training dataset may be provided to each of the first embedding layer 808B and the second embedding layer 810B. A first word vector representation of the provided first natural language query may be output from each of the first embedding layer 808B and the second embedding layer 810B. Each of the first embedding layer 808B and the second embedding layer 810B may implement word embedding techniques, for example, Word2Vec technique, to output the first word vector representation for the first natural language query. The Word2Vec technique may implement one of a skip gram model or a Common Bag of Words (CBOW) to learn word embedding using a shallow neural network.

The output word vector representation of the first natural language query may be provided as a first input to the first Bi-LSTM network 808C and a second input to the second Bi-LSTM network 810C. Each of the first Bi-LSTM network 808C and the second Bi-LSTM network 810C may have two LSTM networks, i.e. a first LSTM network and a second LSTM network. The output word vector representation may be provided as-is to the first LSTM network. Whereas, a reversed copy of the output word vector representation may be provided as an input sequence to the second LSTM network. By providing as-is copy and reversed copy of the output word vector representation, each of the first Bi-LSTM network 808C and the second Bi-LSTM network 810C may learn additional context of the first natural language query and result in a faster and accurate learning.

Additionally, or alternatively stated, the first Bi-LSTM network 808C may be trained based on a plurality of query-API name pairs of the training dataset. Each query-API name pair of the training dataset may include a natural language query and a web API name for a corresponding web API of the plurality of web APIs. The natural language query may be provided as an input to the first Bi-LSTM network 808C while the web API name may be used as a ground truth output to update weights of the first Bi-LSTM network 808C and minimize a cost function for the first Bi-LSTM network 808C. Similarly, the second Bi-LSTM network 810C may be trained based on a plurality of query-endpoint pairs of the training dataset. Each query-endpoint pair of the training dataset may include a natural language query and an endpoint for the corresponding web API of the plurality of web APIs. The natural language query may be provided as input to the second Bi-LSTM network 810C while the endpoint may be used as a ground truth output to update weights of the second Bi-LSTM network 810C and minimize a cost function for the second Bi-LSTM network 810C.

The trained first Bi-LSTM network 808C and the trained second Bi-LSTM network 810C may be set as untrainable. As an example, neural weight values and all the hyper-parameters, for example, network structure/size, learning rate, etc., may be fixed. The outputs of the first Bi-LSTM network 808C and the second Bi-LSTM network 810C may be provided to the concatenate layer 812 which concatenates the outputs together and provides the concatenated outputs to the next layer, i.e. the dense layer 806A of the ANN in the second stage 806 of the example ML model 802.

After setting, a model-fitting operation may be applied on the first stage 804 and the second stage 806 based on a plurality of query-endpoint-API name pairs of the training dataset. Each query-API name-endpoint pair may include the natural language query, the web API name, and the endpoint for the corresponding web API. The natural language query may be provided as input to the first stage 804 (the weights of the corresponding layers in 808 and 810 may be set as untrainable) while the API name and the endpoint may be used as ground truth outputs to update weights of for the example ML model 802 and minimize a cost function for the entire ML model 802. Thereafter, the example ML model 802, i.e. the trained ML model 802, may be obtained based on the application of the model-fitting operation on the first stage 804 and the second stage 806. As an example, in the model-fitting operation, one or more hyper-parameters and weights for the entire ML model 802 may be recursively updated for a number of epochs till the cost function is minimized.

Once the example ML model 802 is obtained, the dense layer 814 may be configured to output a set of recommendation results 816 for a natural language query as an input to the example ML model 802. Each recommendation result may include a specific web API and a specific endpoint matching the context/intent of the natural language query. The dense layer 814 may output a likelihood value (or a confidence score) indicating a prominence/degree of match for the specific web API and the specific endpoint.

In one or more embodiments, the dense layer 808D may be configured to output a prediction result 808E and the dense layer 810D may be configured to output a prediction result 810E. The prediction result 808E may be a specific web API name for a given natural language query. Similarly, the prediction result 810E may be a specific endpoint for the specific web API name for the given natural language query. These two dense layers 808D and 810D are mainly used to train the weights of the corresponding layers (808A, 808B, 808C, 810A, 810B, 810C) in the first stage 804 by using the training dataset.

Due to dual stage transfer learning architecture, the example ML model 802 achieves a high classification accuracy (~90% accuracy) as compared to a standard deep learning model. As an example, a classification accuracy of "~50%" may be achieved using Bi-LSTM only to recommend web API and its endpoint.

Figure 9A:
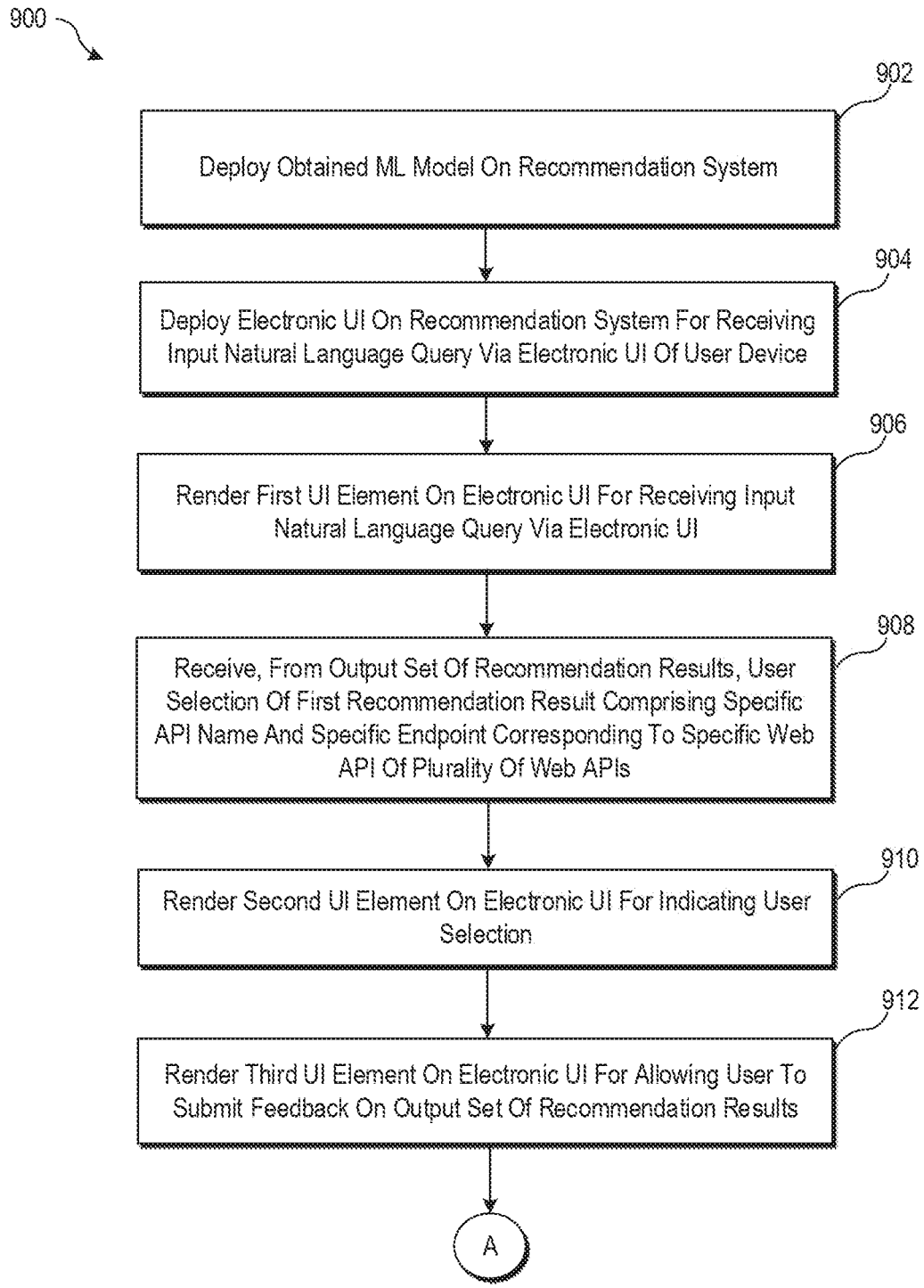
FIGS. 9A and 9B, collectively, illustrate a flowchart of an example method for retraining and redeploying ML model on the example recommendation system of FIG. 2.
Figure 9B:
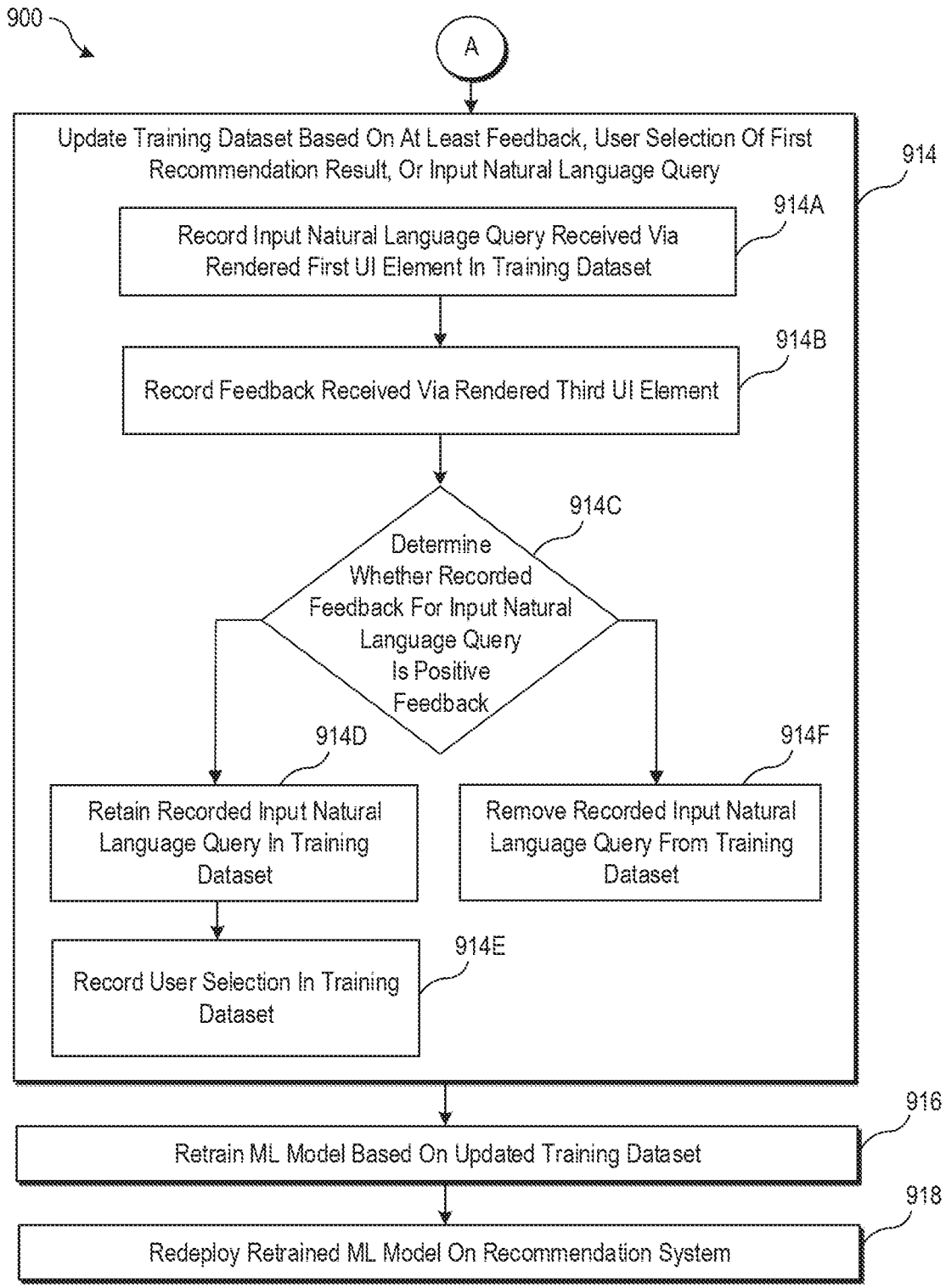

FIGS. 9A and 9B, collectively, illustrate a flowchart of an example method for retraining and redeploying ML model 102A on the example recommendation system of FIG. 2, according to at least one embodiment described in the present disclosure. FIGS. 9A and 9B are explained in conjunction with elements from FIGS. 1, 2, 3, 4A, 4B, 4C, 5, 6, 7, and 8. With reference to FIGS. 9A and 9B, there is shown a flowchart 900. The method illustrated in the flowchart 900 may start at 902 and may be performed by any suitable system, apparatus, or device, such as by the example recommendation system 202 of FIG. 2.

At 902, the ML model 102A (i.e. the trained ML model 102A) may be deployed on the example recommendation system 202. In one or more embodiments, the processor 204 may be configured to deploy the ML model 102A on the example recommendation system 202. Once deployed, all the hyper-parameters and weights may be frozen to prepare the ML model 102A for receiving user inputs including input natural language queries.

At 904, the electronic UI 214 may be deployed on the example recommendation system 202 for receiving the input natural language query via the electronic UI 214 of the user device 108. As an example, for the electronic UI 214 to be displayed on the user device 108, resources (e.g., web page elements, codes, graphics, etc.) may have to be deployed on the example recommendation system 202. Once a user request, such as a login or a web page access, is made via the user device 108, the example recommendation system 202 may be configured to transmit the resources to the user device 108 for rendering the electronic UI 214 on the user device 108.

At 906, a first UI element may be rendered on the electronic UI 214 for receiving the input natural language query via the electronic UI 214. In one or more embodiments, the processor 204 may be configured to instruct the user device 108 to render the first UI element on the electronic UI 214 for receiving the input natural language query. The first UI element may be a search interface (e.g., a text-based search interface) to be used by a user (such as a developer) to provide the input natural language query. The input natural language query may be indicative of one or more of a user intent, an API functionality of interest, or problem statement of interest to the user. In other words, the input natural language query may reflect user's desire/intent for a functionality or a solution to a problem which the user might want to incorporate using a desirable web API and its endpoint in user's software application. An example of the first UI element is provided in FIG. 10A. The ML model 102A (i.e. the deployed and trained ML model) may be configured to receive the input natural language query via the first UI element and output a set of recommendation results based on the input natural language query.

At 908, a user selection of a first recommendation result from the output set of recommendation results may be received. The first recommendation result may include the specific API name and the specific endpoint corresponding to a specific web API of the plurality of web APIs. In one or more embodiments, the processor 204 may be configured to instruct the user device 108 to receive the user selection of the first recommendation result from the output set of recommendation results.

At 910, a second UI element may be rendered on the electronic UI 214 for indicating the user selection. In one or more embodiments, the processor 204 may be configured to instruct the user device 108 to render the second UI element on the electronic UI 214 for indicating the user selection of the first recommendation result of the output set of recommendation results. An example of the second UI element is provided in FIG. 10B. In this example UI, API and its endpoint are shown together in a same page. Alternatively, an UI can initially show API name, and when user selects a particular API, the UI will then show the recommended endpoint names for this API.

At 912, a third UI element may be rendered on the electronic UI 214 for allowing a user to submit a feedback on the output set of recommendation results. The feedback may be one of a positive feedback or a negative feedback. The positive feedback may indicate that the user selection of the first recommendation result of the output set of recommendation results may be of use to the user and may be relevant in light of the input natural language query. Similarly, the negative feedback may indicate that the output set of recommendation results may be irrelevant to the user or may be irrelevant in light of the input natural language query. Also, the negative feedback may be indicative of a user's choice to not select any recommendation result of the output set of recommendation results. In certain embodiments, the feedback may be measured in terms of "1" to "5" star ratings. For example, a "4" or a "5" star rating may indicate a positive feedback, a "1" or "2" star rating may indicate a negative feedback, and "3" star rating may indicate a neutral feedback. An example of the third UI element is provided in FIG. 10B.

At 914, the training dataset may be updated based on at least the feedback, the user selection of the first recommendation result, or the input natural language query. In one or more embodiments, the processor 204 may be configured to update the training dataset based on at least the feedback, the user selection of the first recommendation result, or the input natural language query. The method of updating the training dataset is described from 914A to 914E.

At 914A, the input natural language query received via the rendered first UI element may be recorded in the training dataset. In one or more embodiments, the processor 204 may be configured to record the input natural language query received via the rendered first UI element in the training dataset.

At 914B, the feedback received via the rendered third UI element may be recorded in the training dataset. In one or more embodiments, the processor 204 may be configured to record the feedback received via the rendered third UI element in the training dataset.

At 914C, it may be determined whether the recorded feedback for the input natural language query is the positive feedback. In one or more embodiments, the processor 204 may be configured to determine whether the recorded feedback for the input natural language query is the positive feedback. In case the recorded feedback for the input natural language query is the positive feedback, control may pass to 914D. Otherwise, control may pass to 914F.

At 914D, the recorded input natural language query may be retained in the training dataset based on the determination that the recorded feedback is the positive feedback. In one or more embodiments, the processor 204 may be configured to retain the recorded input natural language query in the training dataset based on the determination that the recorded feedback is the positive feedback. As an example, for a given input natural language query, it may be checked what APIs/endpoints that user selected and in case the user leaves the positive feedback (e.g. five stars) for one or more recommendation results, the input natural language query may be recorded in the training dataset.

At 914E, the user selection may be recorded in the training dataset based on the determination that the recorded feedback is the positive feedback. In one or more embodiments, the processor 204 may be configured to record the user selection of the first recommendation result in the training dataset. The user selection of the first recommendation result may indicate that the first recommendation result may be of more relevance as compared to rest of the output set of recommendation results, even if the first recommendation result may be assigned a lower confidence score as compared to the rest of the output set of recommendation results.

At 914F, the recorded input natural language query may be removed from the training dataset based on the determination that the recorded feedback is the negative feedback. In one or more embodiments, the processor 204 may be configured to remove the recorded input natural language query from the training dataset based on the determination that the recorded feedback is the negative feedback.

At 916, the ML model 102A may be retrained based on the updated training dataset. As an example, the weights and/or one or more hyper-parameters of the ML model 102A may be adjusted such that a global minimum of the cost function is achieved in certain number of epochs. In one or more embodiments, the processor 204 may be configured to retrain the ML model 102A based on the updated training dataset.

At 918, the retrained ML model 102A may be deployed on the example recommendation system 202. Once retrained, the ML model 102A may be trained to output recommendation results with an improved accuracy and lower classification error. In one or more embodiments, the processor 204 may be configured to redeploy the retrained ML model 102A on the example recommendation system 202. The Control passes to end. Although the flowchart 900 is illustrated as discrete operations, such as 902, 904, 906, 908, 910, 912, 914, 914A-914F, 916, and 918. However, in certain embodiments, such discrete operations may be further divided into additional operations, combined into fewer operations, or eliminated, depending on the particular implementation without detracting from the essence of the disclosed embodiments.

Figure 10A:
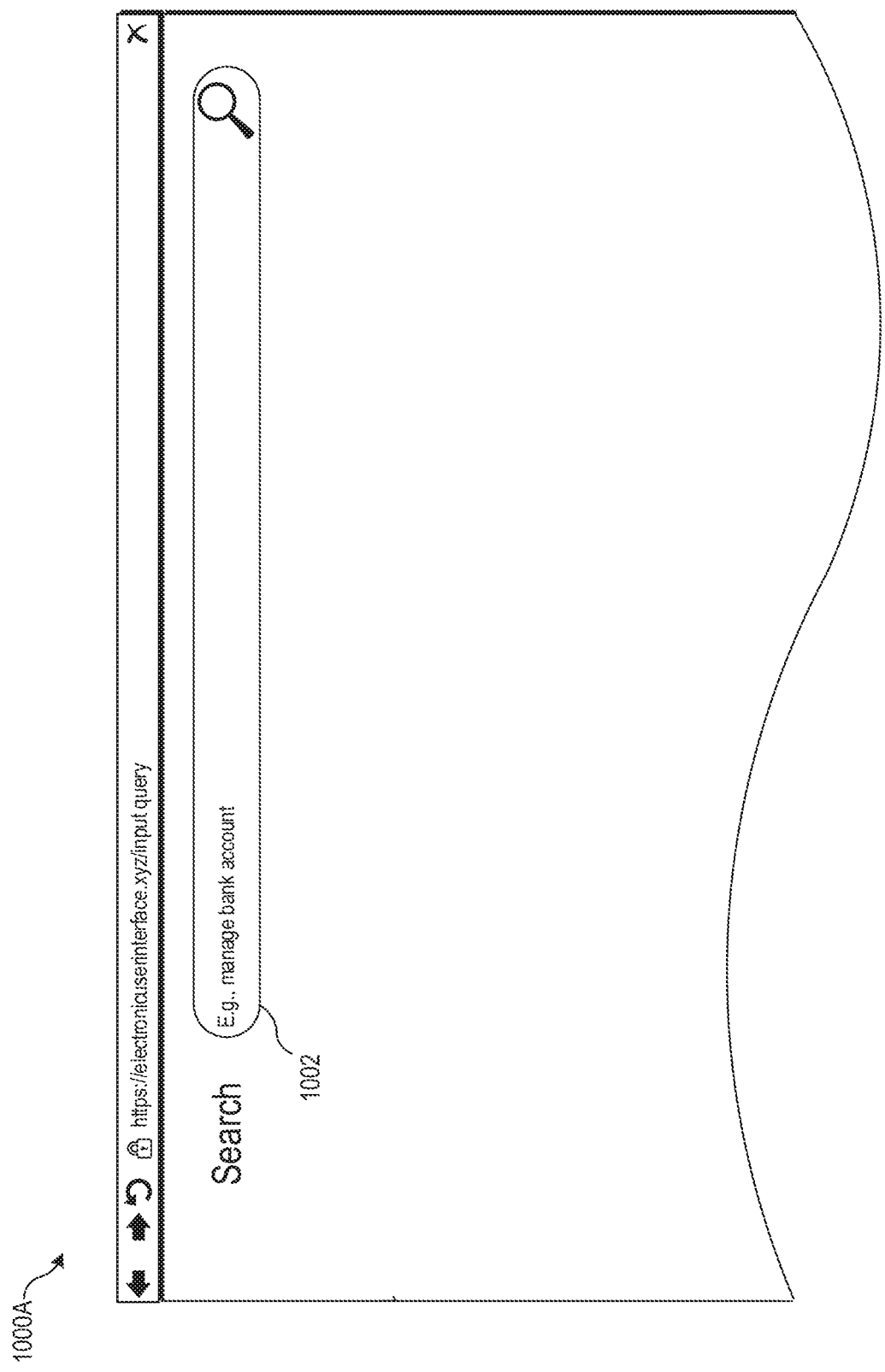
FIG. 10A illustrates an example electronic user interface for displaying a UI element for receiving input natural language queries.

FIG. 10A illustrates an example electronic user interface for displaying a UI element for receiving input natural language queries, according to at least one embodiment described in the present disclosure. FIG. 10A is explained in conjunction with elements from FIGS. 1, 2, 3, 4A, 4B, 4C, 5, 6, 7, 8, and 9. With reference to FIG. 10A, there is shown an example electronic UI 1000A. The example electronic UI 1000A may be an electronic view, such as an electronic web page rendered on a browser window. The example electronic UI 1000A may include a first UI element 1002 which may be a text-based search interface for allowing a user to provide an input natural language query to the example recommendation system 202. Shown as an example, the input natural language query may be "manage bank account" and may be provided to the example recommendation system 202 via the communication network 110.

Figure 10B:
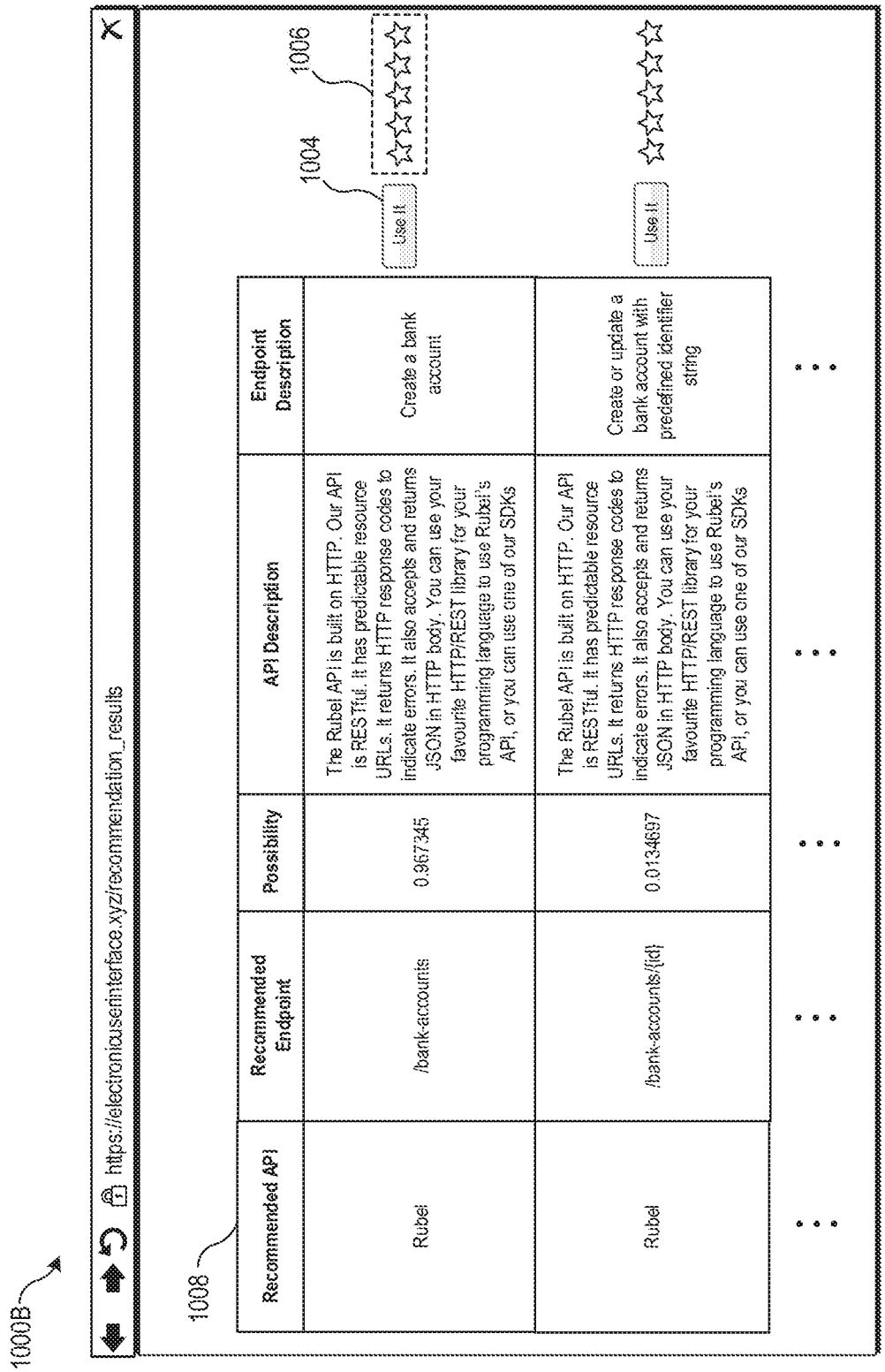
FIG. 10B illustrates an example electronic user interface for displaying another UI element for displaying recommendation results and receiving feedback over quality of recommendation results, all according to at least one embodiment described in the present disclosure.

FIG. 10B illustrates an example electronic user interface for displaying another UI element for displaying recommendation results and receiving feedback over quality of recommendation results, according to at least one embodiment described in the present disclosure. FIG. 10B is explained in conjunction with elements from FIGS. 1, 2, 3, 4A, 4B, 4C, 5, 6, 7, 8, 9, and 10A. With reference to FIG. 10B, there is shown an example electronic UI 1000B. The example electronic UI 1000B may be an electronic view, such as an electronic web page rendered on a browser window. The example electronic UI 1000B may include a second UI element 1004, a third UI element 1006, and a fourth UI element 1008. The fourth UI element 1008 may include a set of recommendation results for the input natural language query received via the first UI element 1002. The set of recommendation results may be structured into a table format having a set of fields, such as "Recommended API", "Recommended Endpoint", "Possibility", "API description", and "Endpoint Description". In the example electronic UI 1000B, API and its endpoint are shown together in a same page. Alternatively, an UI can initially show API name, and when user selects a particular API, the UI will then show the recommended endpoint names for this API.

The second UI element 1004 may be, for example, a "Use it" button, which may help the user to include the web API and the endpoint specified in a first recommendation result of the output set of recommendation results in user's software application. Also, the second UI element 1004 may indicate a user selection of the, for example, "Use it" button, for the first recommendation result. Similarly, the third UI element 1006 may allow a user to submit a feedback on the output set of recommendation results.

Various embodiments of the disclosure may provide one or more non-transitory computer-readable storage media configured to store instructions that, in response to being executed, cause a recommendation system (such as the example recommendation system 202) to perform operations. The operations may include extracting, from a web API repository (such as the web API repository 104), first information associated with a plurality of web APIs. The operations may further include constructing an initial dataset associated with the plurality of web APIs by performing a first set of information processing operations on the extracted first information. The operations may further include constructing a training dataset by performing a second set of information processing operations on the constructed initial dataset. The constructed training dataset may include a plurality of natural language queries, a plurality of web API names, and a plurality of endpoints associated with the plurality of web API names. The operation may further include obtaining a ML model (such as the ML model 102A) based on the constructed training dataset and receiving an input natural language query via an electronic UI (such as the electronic UI 214) of a user device (such as the user device 108). The ML model may be trained based on the constructed training dataset. The operations may further include providing the received input natural language query to the obtained ML model and outputting a set of recommendation results based on the provided input natural language query to the obtained ML model. Each recommendation result may include a specific API name of the plurality of web API names and a specific endpoint of the plurality of endpoints.

As indicated above, the embodiments described in the present disclosure may include the use of a special purpose or general purpose computer (e.g., the processor 204 of FIG. 2) including various computer hardware or software modules, as discussed in greater detail below. Further, as indicated above, embodiments described in the present disclosure may be implemented using computer-readable media (e.g., the memory 206 or the persistent data storage 208 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    extracting, from a web application programming interface (API) repository, first information associated with a plurality of web APIs;
    constructing an initial dataset associated with the plurality of web APIs by performing a first set of information processing operations on the extracted first information;
    constructing a training dataset by performing a second set of information processing operations on the constructed initial dataset,
       wherein the constructed training dataset comprises a plurality of natural language queries, a plurality of web API names, and a plurality of endpoints associated with the plurality of web API names;
    obtaining a Machine Learning (ML) model based on the constructed training dataset, wherein the ML model is trained based on the constructed training dataset;
    receiving an input natural language query via an electronic user interface (UI) of a user device;
    providing the received input natural language query to the obtained ML model; and
    outputting a set of recommendation results based on the provided input natural language query to the obtained ML model,
       wherein each recommendation result comprises a specific API name of the plurality of web API names and a specific endpoint of the plurality of endpoints;
    wherein performing the first set of information processing operations includes,
       generating a plurality of sentence-tokens based on the extracted first information;
       filtering the generated plurality of sentence-tokens based on removal of one or more of a stopping word, a symbol, a special character, a space between two characters, or a short-description sentence from the generated plurality of sentence-tokens; and
       obtaining a plurality of sentences by application of a stemming operation on the filtered plurality of sentence-tokens.

2. The method according to claim 1, wherein the web API repository comprises a plurality of documents associated with the plurality of web APIS,
    wherein each document of the plurality of documents comprises information mapped to a plurality of fields associated with a corresponding web API of the plurality of web APIS.

3. The method according to claim 1, further comprising:
    parsing each document of a plurality of documents in the web API repository;
    in each document of the plurality of documents, identifying information associated with a corresponding web API based on the parsing of a corresponding document of the plurality of documents; and
    extracting the first information based on the identified information in each document of the plurality of documents,
       wherein the extracted first information comprises an API description, an endpoint description, an input parameter description, an output parameter description, a primary category, a secondary category, one or more tags, and an API title associated with each web API of the plurality of web APIS.

4. The method according to claim 1, further comprising:
    populating a table with the obtained plurality of sentences, the plurality of web API names, and the plurality of endpoints associated with the plurality of web API names; and
    constructing the initial dataset by including the populated table in the initial dataset.

5. The method according to claim 1, wherein the plurality of natural language queries comprises a set of question-type queries, a set of command-type queries, a set of keyword-type queries, and a set of title-type queries.

6. The method according to claim 1, wherein the second set of information processing operations comprises:
    determining a plurality of Part-of-Speech (POS) tags for each sentence of a plurality of sentences in the constructed initial dataset;
    forming a syntactic dependency tree for each sentence of the plurality of sentences in the constructed initial dataset; and
    forming the plurality of natural language queries based on the determined plurality of POS tags and the formed syntactic dependency tree for each sentence of the plurality of sentences.

7. The method according to claim 6, wherein the forming the plurality of natural language queries further comprises:
    forming, from a first sentence of the plurality of sentences, a first command-type query based on a determination that a root node in the formed syntactic dependency tree for the first sentence is a verb in the determined plurality of POS tags for the first sentence;
    forming, from a second sentence of the plurality of sentences, a second command-type query based on a determination that a subject in the second sentence is a nominal subject in the formed syntactic dependency tree for the second sentence and the subject is a verb in the determined plurality of POS tags for the second sentence;
    forming a third command-type query based on a API mash-up description on a web document associated with a web API mash-up;
    forming a fourth command-type query based on an API description on an applet description document associated with a web API of the plurality of web APIS;
    forming a fifth command-type query based on a trigger sentence segment and an action sentence segment in the API mash-up description on the web document; and
    constructing the training dataset based on the formed first command-type query, the formed second command-type query, the formed third command-type query, the formed fourth command-type query, and the formed fifth command-type query.

8. The method according to claim 6, further comprising:
forming, from a first sentence of the plurality of sentences, a first question-type query based on a determination that a root node in the formed syntactic dependency tree for the first sentence is a verb in the determined plurality of POS tags for the first sentence;
forming, from a second sentence of the plurality of sentences, a second question-type query based on a determination that a subject in the second sentence is a nominal subject in the formed syntactic dependency tree for the second sentence and the subject is a verb in the determined plurality of POS tags for the second sentence;
forming a third question-type query based on at least an input parameter description or an output parameter description in the constructed initial dataset; and
constructing the training dataset based on the formed first question-type query, the formed second question-type query, and the formed third question-type query.

9. The method according to claim 6, further comprising:
extract one or more keywords, one or more noun phases, one or more primary categories, one or more secondary categories, and one or more tags from each sentence of the plurality of sentences;
forming a keyword-type query based on the extracted one or more keywords, the one or more noun phases, the one or more primary categories, the one or more secondary categories, and the one or more tags; and
constructing the training dataset based on the formed keyword-type query.

10. The method according to claim 1, wherein the ML model is a dual-stage transfer learning model comprising a first stage and a second stage,
wherein the first stage comprises a first model and a second model arranged in a parallel configuration,
wherein the first model comprises a first embedding layer and a first Bi-Long Short-Term Memory (Bi-LSTM) network coupled to the first embedding layer,
wherein the second model comprises a second embedding layer and a second Bi-LSTM network coupled to the second embedding layer, and
wherein the second stage comprises an Artificial Neural Network (ANN) coupled to corresponding output layers of the first model and the second model.

11. The method according to claim 10, further comprising:
providing a first natural language query of the plurality of natural language queries to each of the first embedding layer and the second embedding layer;
outputting, from each of the first embedding layer and the second embedding layer, a first word vector representation of the provided first natural language query; and
providing the output word vector representation of the first natural language query as a first input to the first Bi-LSTM network and a second input to the second Bi-LSTM network.

12. The method according to claim 10, wherein the obtaining the ML model comprises:
training the first Bi-LSTM network based on a plurality of query-API name pairs of the training dataset,
wherein each query-API name pair of the training dataset comprises a natural language query and a web API name for a corresponding web API of the plurality of web APIs;
training the second Bi-LSTM network based on a plurality of query-endpoint pairs of the training dataset,
wherein each query-endpoint pair of the training dataset comprises a natural language query and an endpoint for the corresponding web API;
setting the trained first Bi-LSTM network and the trained second Bi-LSTM network as untrainable; and
after the setting, applying a model-fitting operation on the first stage and the second stage based on a plurality of query-API name-endpoint pairs of the training dataset,
wherein each query-endpoint-API name pair comprises the natural language query, the web API name, and the endpoint for the corresponding web API,
wherein the ML model is obtained based on the application of the model-fitting operation on the first stage and the second stage.

13. The method according to claim 1, further comprising:
deploying the obtained ML model on a recommendation system; and
deploying the electronic UI on the recommendation system for receiving the input natural language query via the electronic UI of the user device.

14. The method according to claim 13, further comprising:
rendering a first UI element on the electronic UI for receiving the input natural language query via the electronic UI;
receiving, from the output set of recommendation results, a user selection of a first recommendation result comprising the specific API name and the specific endpoint corresponding to a specific web API of the plurality of web APIS;
rendering a second UI element on the electronic UI for indicating the user selection; and
rendering a third UI element on the electronic UI for allowing a user to submit a feedback on the output set of recommendation results, wherein the feedback is one of a positive feedback or a negative feedback.

15. The method according to claim 14, further comprising:
updating the training dataset based on at least the feedback, the user selection of the first recommendation result, or the input natural language query,
wherein the updating comprises:
recording the input natural language query received via the rendered first UI element in the training dataset;
recording the feedback received via the rendered third UI element;
determining whether the recorded feedback for the input natural language query is the positive feedback;
retaining the recorded input natural language query in the training dataset based on the determination that the recorded feedback is the positive feedback;
recording the user selection in the training dataset based on the determination that the recorded feedback is the positive feedback; and
removing the recorded input natural language query from the training dataset based on the determination that the recorded feedback is the negative feedback.

16. The method according to claim 15, further comprising:
retraining the ML model based on the updated training dataset; and
redeploying the retrained ML model on the recommendation system.

17. The method according to claim 1, wherein the output set of recommendation results comprises a set of likelihood values and a set of output pairs of API name and endpoint corresponding to the set of likelihood values.

18. The method according to claim 17, further comprising:
sorting the set of likelihood values and the set of output pairs of API name and endpoint in an ascending order; and
displaying, on the electronic UI, the sorted set of output pairs of API name and endpoint.

19. One or more non-transitory computer-readable storage media configured to store instructions that, in response to being executed, cause a recommendation system to perform operations, the operations comprising:
extracting, from a web application programming interface (API) repository, first information associated with a plurality of web APIs;
constructing an initial dataset associated with the plurality of web APIs by performing a first set of information processing operations on the extracted first information;
constructing a training dataset by performing a second set of information processing operations on the constructed initial dataset,
wherein the constructed training dataset comprises a plurality of natural language queries, a plurality of web API names, and a plurality of endpoints associated with the plurality of web API names;
obtaining a Machine Learning (ML) model based on the constructed training dataset, wherein the ML model is trained based on the constructed training dataset;
receiving an input natural language query via an electronic user interface (UI) of a user device;
providing the received input natural language query to the obtained ML model; and
outputting a set of recommendation results based on the provided input natural language query to the obtained ML model,
wherein each recommendation result comprises a specific API name of the plurality of web API names and a specific endpoint of the plurality of endpoints;
wherein performing the first set of information processing operations includes,
generating a plurality of sentence-tokens based on the extracted first information;
filtering the generated plurality of sentence-tokens based on removal of one or more of a stopping word, a symbol, a special character, a space between two characters, or a short-description sentence from the generated plurality of sentence-tokens; and
obtaining a plurality of sentences by application of a stemming operation on the filtered plurality of sentence-tokens.

* * * * *